(12) United States Patent
Tamari

(10) Patent No.: US 9,024,974 B2
(45) Date of Patent: May 5, 2015

(54) AUGMENTED REALITY SYSTEM, APPARATUS AND METHOD

(75) Inventor: Yusuke Tamari, Riverdale, NJ (US)

(73) Assignee: Ricoh Company, Ltd., Tokyo (JP)

( * ) Notice: Subject to any disclaimer, the term of this patent is extended or adjusted under 35 U.S.C. 154(b) by 505 days.

(21) Appl. No.: 13/495,185

(22) Filed: Jun. 13, 2012

(65) Prior Publication Data
US 2013/0339525 A1 Dec. 19, 2013

(51) Int. Cl.
G09G 5/00 (2006.01)
G06F 7/00 (2006.01)
G06F 17/00 (2006.01)
G06F 3/00 (2006.01)
G06F 7/04 (2006.01)
G09B 25/00 (2006.01)
G09B 29/00 (2006.01)
G06F 3/01 (2006.01)
H04W 4/02 (2009.01)
G06F 21/00 (2013.01)
H04L 29/06 (2006.01)
H04W 12/08 (2009.01)

(52) U.S. Cl.
CPC .............. G06F 3/011 (2013.01); G06F 21/00 (2013.01); H04L 63/107 (2013.01); H04W 4/021 (2013.01); H04W 4/026 (2013.01); H04W 12/08 (2013.01)

(58) Field of Classification Search
USPC ................. 345/619, 629, 634; 707/781–788; 715/200, 230, 730–743; 709/203, 225; 726/2–5, 27–30; 434/428, 430, 431
See application file for complete search history.

(56) References Cited

U.S. PATENT DOCUMENTS

| | | | |
|---|---|---|---|
| 2005/0287509 A1* | 12/2005 | Mohler | 434/350 |
| 2008/0070218 A1* | 3/2008 | Ahl et al. | 434/322 |
| 2008/0109888 A1* | 5/2008 | Ullah | 726/7 |
| 2009/0148827 A1* | 6/2009 | Argott | 434/433 |
| 2010/0228602 A1* | 9/2010 | Gilvar et al. | 705/10 |
| 2013/0246343 A1* | 9/2013 | Victor | 707/608 |

* cited by examiner

Primary Examiner — Wesner Sajous
Assistant Examiner — Andrew Shin
(74) Attorney, Agent, or Firm — Cooper & Dunham LLP

(57) ABSTRACT

Information technology tools can be provided to manage access by a plurality of attendees through a network to a presentation. Each of the attendees is registered with an associated content access status, and presentation data for the presentation is provided to a registered attendee based on the particular content access status of the registered attendee.

20 Claims, 24 Drawing Sheets

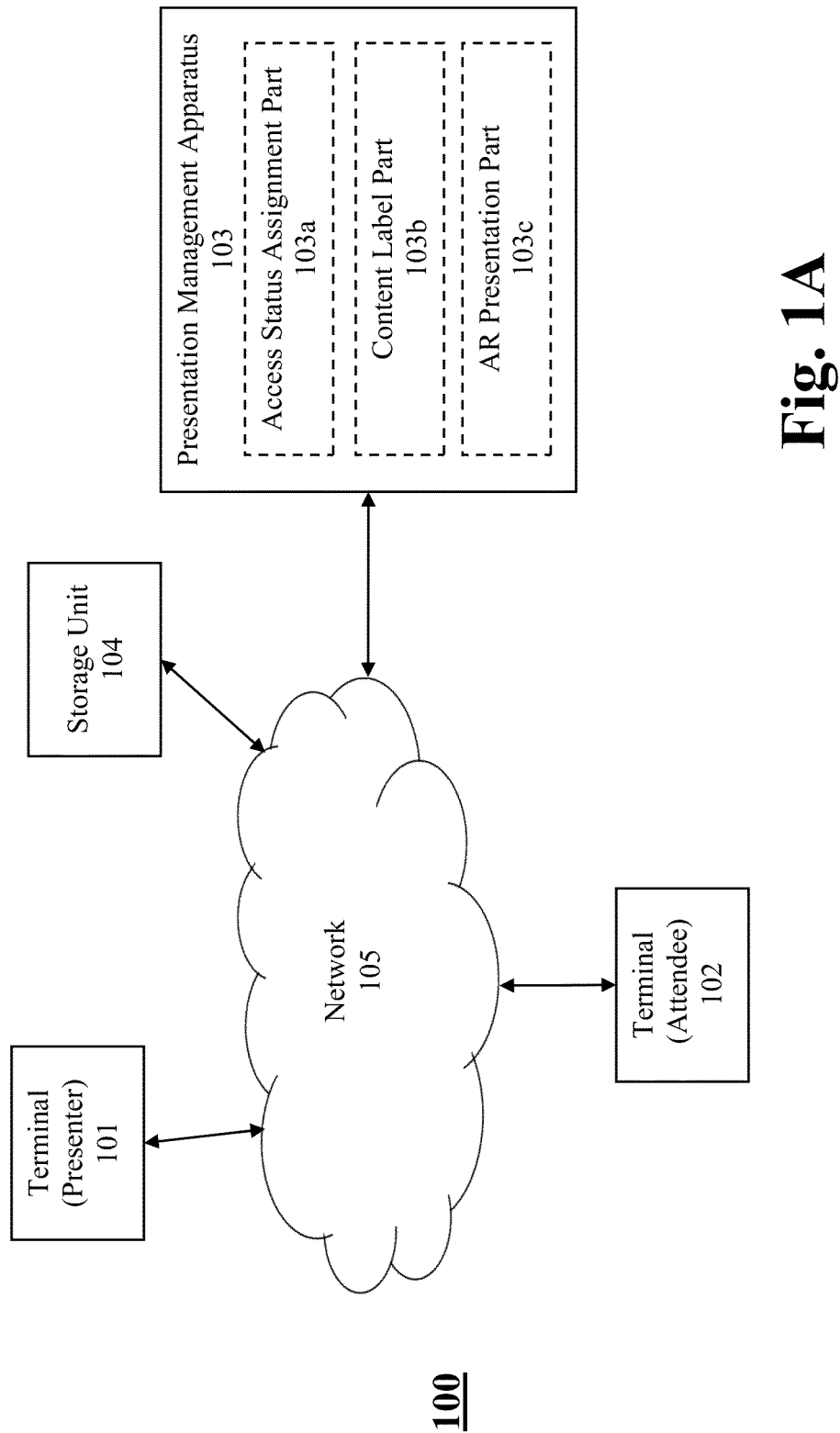

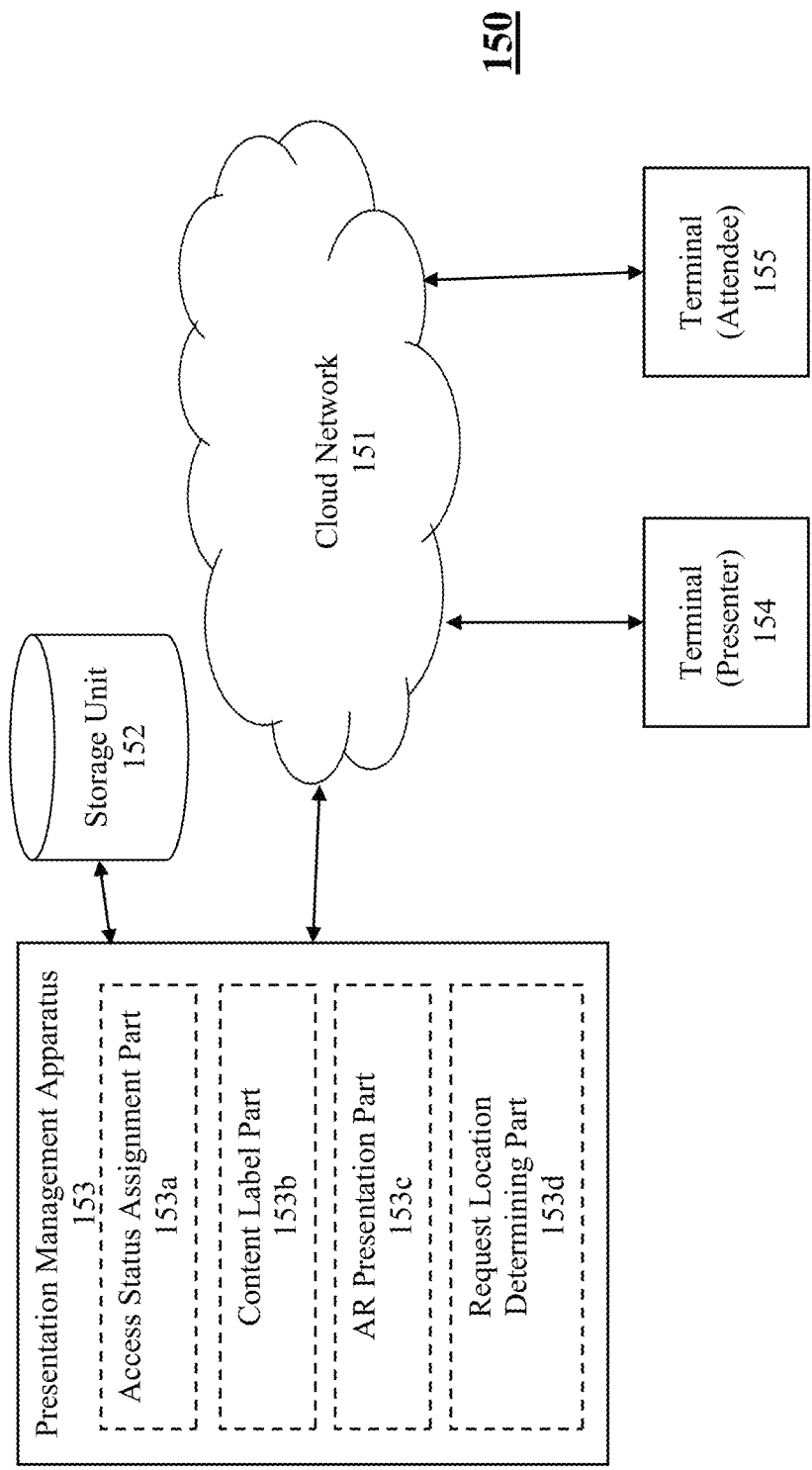

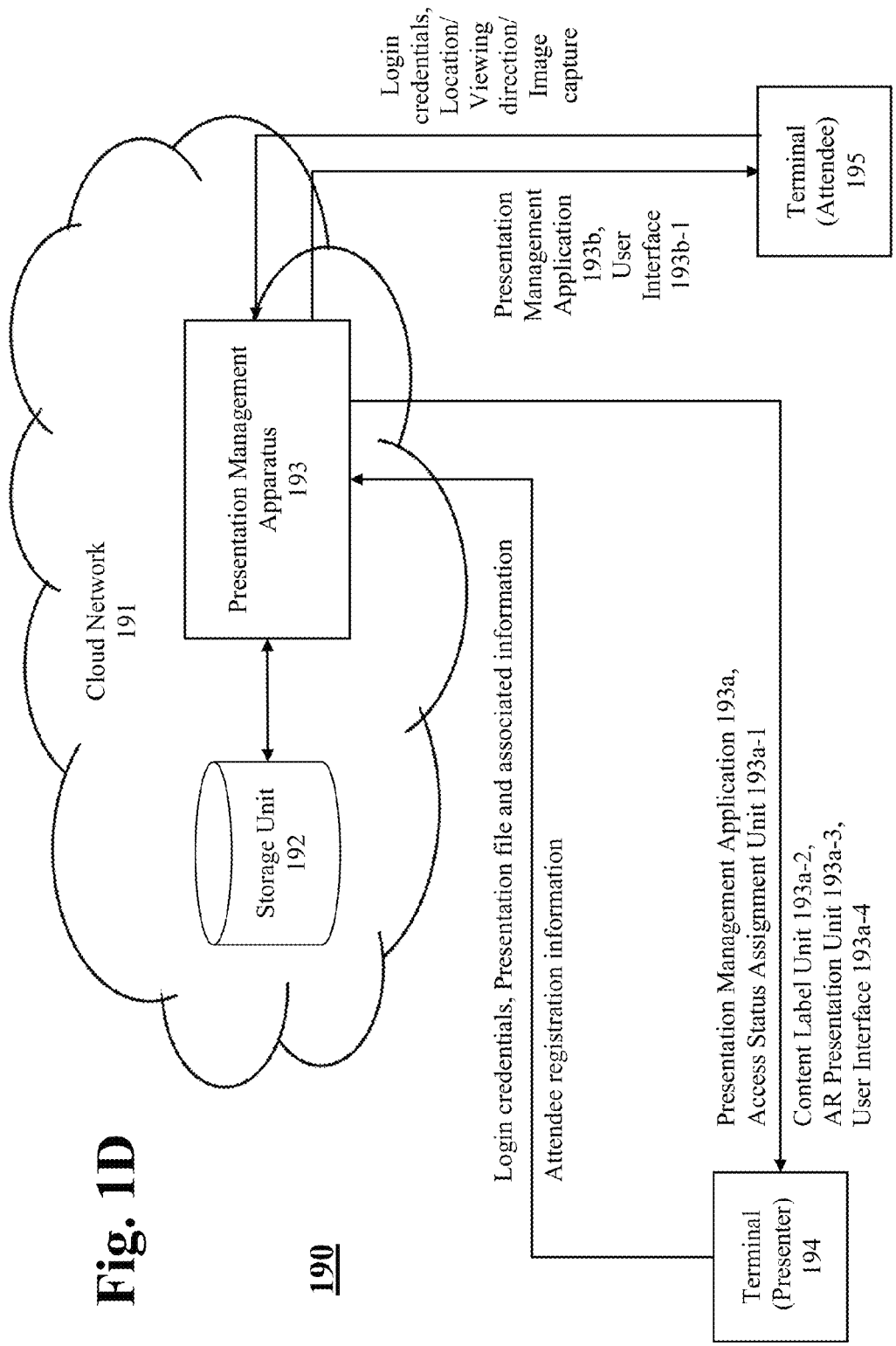

| File Name | Limited Access Pages | Location | Perspective direction | Image |
|---|---|---|---|---|
| Faculty_Meeting_May_2012.ppt | 5-10 | 42.443636,-76.485663 | 5° N | home/faculty/FM052012.jpg |
| Business_Law_Sp12_N7.ppt | 3, 5, 7 | 42.445792,-76.48319 | 255° W | home/BL_SP12-7.jpg |
| Young_Entrepreneurs_Society.ppt | N/A | 42.445483,-76.482246 | 130° SE | home/YES/general.jpg |

Fig. 4A

| File Name | Limited Access Pages | Location | Perspective direction | Image |
|---|---|---|---|---|
| Faculty_Meeting_May_2012_ver1.ppt | 5-10 | 42.443636,-76.485663 | 5° N | home/faculty/FM052012.jpg |
| Faculty_Meeting_May_2012_ver2.ppt | removed | 42.443636,-76.485663 | 5° N | home/faculty/FM052012.jpg |
| Young_Entrepreneurs_Society.ppt | N/A | 42.445483,-76.482246 | 130° SE | home/YES/general.jpg |

Fig. 4C

Original File (A)

Retrieved File (A')

Original File (A)

File A → Page 1 (public)　Page 2 (VIP)　Page 3 (public)

Retrieved File

Regular Attendee (A')

File A' → Page 1　　Page 3

VIP Attendee (A'')

File A'' → Page 1　Page 2　Page 3

| Attendee ID | Status | Public pages provided | Restricted pages provided |
|---|---|---|---|
| John.Doe | VIP | ✓ | ✓ |
| Adam.Smith | VIP | | |
| Michael.Page | VIP | ✓ | ✓ |
| Juan.Chavez | Regular | ✓ | |
| Rory.McDonald | Regular | ✓ | |
| John.Paul | Regular | | |
| Ben.Cohen | Regular | ✓ | |
| Peter.Kim | Regular | | |

Fig. 6A

Company A  Company A Corp.
123 ABC St.
New York, NY 10112

John Doe
Senior Vice President   Tel.: 212-123-4000
Product Marketing       Fax: 212-300-4567

Company B  Company B Corp.
300 XYZ Ave.
New York, NY 10022

Michael Smith
Junior Analyst          Tel.: 212-567-8000
Product Marketing       Fax: 212-700-9876

| Associated Location | (40.7585 – 40.7604, 73.9767 – 73.9812) |
|---|---|
| Request Location | (40.7590, 73.9784) |

| Request location is within range |
|---|
| ✓ |

| Associated Location | (40.7585 – 40.7604, 73.9767 – 73.9812) |
|---|---|
| Request Location | (40.7602, 73.9874) |

| Request location is NOT within range |
|---|
| ✗ |

Fig. 6C

| Associated Direction | 2° N – 42° NE |
|---|---|
| Viewing Direction | 32° NE |

| Viewing direction is within range |
|---|
| ✓ |

| Associated Direction | 2° N – 42° NE |
|---|---|
| Viewing Direction | 119° SE |

| Viewing direction is NOT within range |
|---|
| ✗ |

Fig. 6D

| Associated Image | |
|---|---|
| Image Capture | |

Image capture matches associated image ✓

| Associated Image | |
|---|---|
| Image Capture | |

Image capture does NOT match associated image ✗

Fig. 6E

AUGMENTED REALITY SYSTEM, APPARATUS AND METHOD

TECHNICAL FIELD

This disclosure relates to augmented reality tools, such as, for example, systems, apparatuses, methodologies, computer program products, etc., for managing access by attendees through a network to a presentation.

BACKGROUND

In the current digital age, the trend is that more and more tasks involve use of information technology (IT) and digital media. For example, digital books and e-book readers are becoming very popular and are supplanting printed books and other printed publications, and exchanges of such information often are now performed via e-mail.

However, e-mail is a possible communication mode only when the e-mail address of the targeted audience is known. Further, when the communication to such targeted audience is by a spam, it can be annoying to the recipients of the spam and is a burden to the IT system at large. From the perspective of interests of society and the IT market at large, such burden can outweigh the benefits of transferring digital information to a general audience who may or (or more likely) may not be interested in receiving the spam communication.

There is also significant interest, within niche markets, for use of IT in virtual reality (VR) applications. Computer games and computer simulations, from which users can develop reactive skills, are some examples that have been present for several decades now, but other VR applications have been in place as well in the last several years. Such VR applications are used in entertainment, education, business, healthcare, scientific and other research, government, as well as many other sectors of society.

On the other hand, as digital handsets having advanced user interface and image and/or video capture applications become commonplace, there is a developing market for augmented reality applications. Augmented reality (AR) is a live, direct or indirect, view of a physical, real-world environment which is augmented by computer-generated sensory input such as sound, video, graphics, location information, etc., to enhance the audience's current perception of reality (whereas virtual reality replaces the real world with a simulated one).

There is a need to find useful applications of augmented reality today.

SUMMARY

This disclosure provides tools and features that implement augmented reality in a practical setting. Although embodiments and examples are provided in the context of presentation management, one skilled in the art should appreciate that the aspects, features, functionalities, etc., discussed in this disclosure can also be extended to augmented reality applications outside of the presentation management.

In an aspect of this disclosure, a presentation management system is provided to manage access by a plurality of attendees through a network to a presentation. The presentation management system registers the plurality of attendees along with a content access status of each of the plurality of attendees. Such system also allows a presenter to designate a selected portion of a presentation as being limited access and uploads the presentation along with location information, perspective direction information and/or a presentation image associated with the presentation. The system communicates with an in-range terminal of an attendee to determine whether the attendee is registered. If the attendee is registered, the system can cause the in-range terminal to display a graphical mark for requesting the presentation and when the graphical mark is selected, causes the presentation to be provided on the in-range terminal based on the content access status of the attendee. If the attendee has a special access status, the presentation including the limited access portion can be provided to the attendee. On the other hand, such limited access portion of the presentation may be withheld from an attendee who does not have a special access status.

In another aspect, a physical location of an in-range terminal is compared to a prescribed range of a location associated with a presentation. If such locations match, then the presentation may be made available to the in-range terminal of the user.

In another aspect, a viewing direction of an in-range terminal is compared to a prescribed directional range of a perspective direction associated with a presentation. If such directions match, the presentation may be of interest to a user of the in-range terminal who has the viewing direction that matches the perspective direction of the presentation, and the presentation is made available to the in-range terminal.

In another aspect, a current image capture of a camera application on an in-range terminal is compared to a presentation image associated with a presentation. If such images match, then the presentation may be of interest to a user of the in-range terminal, and the presentation is made available to the in-range terminal of the user.

BRIEF DESCRIPTION OF THE DRAWINGS

The aforementioned and other aspects, features and advantages can be better understood from the following detailed description with reference to the accompanying drawings wherein:

FIG. 1A shows a block diagram of a system, according to an exemplary embodiment;

FIG. 1B shows a block diagram of a system, according to another exemplary embodiment;

FIG. 1D shows a block diagram of a system, according to another exemplary embodiment;

FIG. 4A shows a database of uploaded presentation files, according to an exemplary embodiment;

FIG. 4C shows a database of uploaded presentation files, according to another exemplary embodiment;

FIG. 6A shows a database of registered attendees, according to an exemplary embodiment.

FIG. 6C shows examples of location comparison, according to an exemplary embodiment;

FIG. 6D shows examples of directional comparison, according to an exemplary embodiment;

FIG. 6E shows examples of image comparison, according to an exemplary embodiment;

DETAILED DESCRIPTION

Figure 1C:
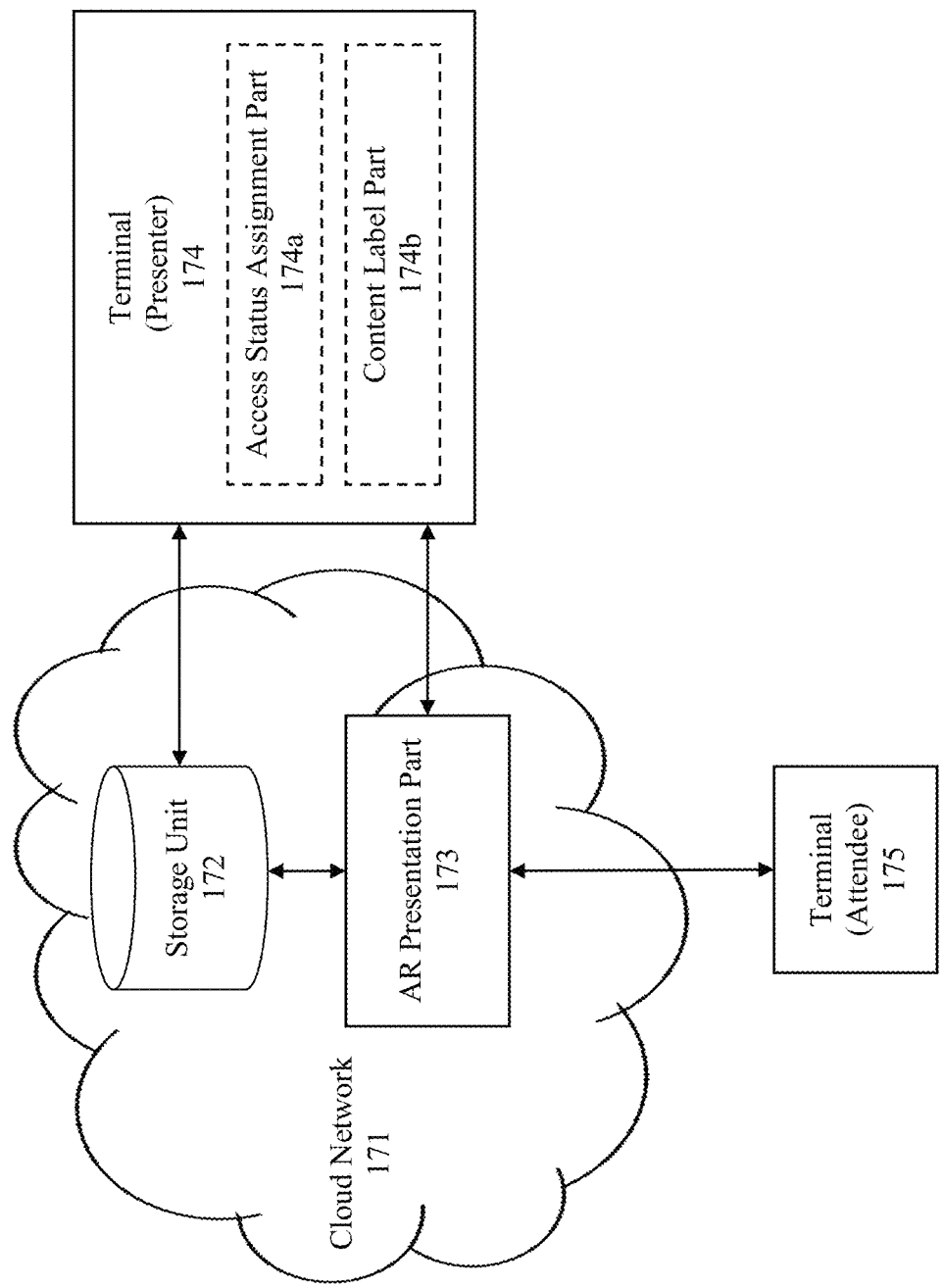
FIG. 1C shows a block diagram of a system, according to another exemplary embodiment.

As mentioned supra, various augmented reality (AR) aspects, features and functionalities are discussed herein by way of examples and embodiments in a context of managing access by attendees to files used in connection with a presentation at lectures, conferences, meetings or shows. In describing such examples and exemplary embodiments, specific terminology is employed for the sake of clarity. However, this disclosure is not intended to be limited to the examples and exemplary embodiments discussed herein, nor to the specific terminology utilized in such discussions, and it is to be understood that each specific element includes all technical equivalents that operate in a similar manner.

Moving on the aforementioned examples, digital information can be presented at meetings, conferences, shows and even in classrooms to a group or audience, via a display device such as a projector or a monitor. Often, the presenter of such information has a digital copy of the information presented to the audience stored on a hard disk drive (HDD) of his or her laptop or virtual desktop. In such a case, the audience may wish to access the copy of the presentation to, for example, refer to the presentation slides on their mobile devices as the presenter proceeds through the presentation. In order to do so, attendees who are interested in accessing the presentation on their mobile devices must ask the presenter for a copy of the presentation file (e.g. via e-mail). However, the presenter is unlikely to respond to such requests until after the presentation is over. Even if the presenter is able to respond to such requests during the presentation, it is difficult for the presenter to verify the identity of the individuals requesting the presentation file. Further, it is burdensome for the presenter to individually send the presentation file to each requesting attendee, and it is inconvenient for the audience to wait for the file.

One way of dealing with such a problem is to upload the presentation file to a web space (either public or private) and provide the attendees with instructions on how to access the web space, so that the attendees of the presentation can access the file without having to go through the presenter. In such a case, unless the presenter feels that the presentation file should be accessible by everyone, he or she would likely wish to place some restrictions on who can access the presentation file from what location. However, it is difficult to restrict or customize access by the attendees when the file is directly downloaded from the web space. Further, it is difficult for the presenter to know who accessed the file, or if the file was accessed by an attendee of the presentation or by someone who did not attend the presentation.

Referring now to the drawings, wherein like reference numerals designate identical or corresponding parts throughout the several views, FIG. 1A shows a block diagram of a system 100, according to an exemplary embodiment of the present disclosure. The system 100 includes terminals 101 and 102, a presentation management apparatus 103 and a storage unit 104, all of which are interconnected by a network 105.

The terminal 101 represents a terminal device of a presenter at a conference, a meeting or a lecture. The terminal 101 is used by the presenter to interact with the presentation management apparatus 103. The presenter may submit information to the presentation management apparatus 103 via a user interface provided by the presentation management apparatus 103. For example, the presenter may, via the terminal 101 and the presentation management apparatus 103, register attendees and their content access statuses in attendee database maintained in the storage unit 104, upload a presentation file to the storage unit 104 or link a file already existing in the storage unit 104 to the presentation.

Similarly, the terminal 102 represents a terminal device of an attendee at the conference, meeting or lecture. The terminal 102 is used by the attendee to access a presentation file uploaded by the presenter via the terminal 101.

The terminals 101 and 102 may be equipped with a variety of functionalities such as a camera functionality, a location determining functionality (e.g. GPS) and a compass functionality, along with the software and hardware necessary to implement such functionalities (e.g. camera lenses, a magnetic sensor, a GPS receiver, drivers and various applications). Such functionalities are further described infra in connection with FIGS. 2A-2C.

The terminals 101 and 102 can be any computing device, including but not limited to a personal, notebook or workstation computer, a kiosk, a PDA (personal digital assistant), a mobile phone or handset, a tablet, another information terminal, etc., that can communicate with other devices through the network 105. Although only two terminals are shown in FIGS. 1A-1D, it should be understood that the system 100 can include a plurality of terminals (which can have similar or different configurations). The terminals 101 and 102 are further described infra with reference to FIG. 2A.

The presentation management apparatus 103 includes an access status assignment part 103a, a control label part 103b and an AR (Augmented Reality) presentation part 103c.

Augmented reality describes a concept wherein a user is allowed to see a presentation of a physical, real-world environment augmented with or superimposed by computer-generated sensory input such as sound, video, graphics or text. Augmented reality can be implemented, for example, on mobile devices that include digital cameras. In such implementations, a view that is currently being captured by the camera can be displayed on a screen of the mobile device, and computer-generated graphical or textual data pertaining to the view being captured by the camera can be shown in addition to what is being captured by the camera. For example, according to an exemplary embodiment of the present disclosure, when an attendee of a conference holds his or her mobile device such that the camera on the mobile device faces a presentation at the conference, the mobile device may be caused to display a button for requesting a file associated with the presentation. Thus, the presentation management apparatus 103 implements augmented reality to allow users to conveniently access digital content related to an element (e.g. a presentation) in the physical environment, as further described below.

The access status assignment part 103a of the presentation management apparatus 103 registers attendees along with their corresponding content access statuses in an attendee database, which, for example, is in the storage unit 104.

The content label part 103b of the presentation management apparatus 103 applies a special content mark to a selected portion of a presentation, to designate the selected portion of the presentation as being limited access. For example, the special content mark may be applied to a presentation file that the presenter wishes to upload, or to a presentation file that is already stored in the storage unit 104.

The AR presentation part 103c of the presentation management apparatus 103 uploads the presentation file (e.g. a Microsoft PowerPoint document) along with information regarding a location, a perspective direction and/or a presentation image associated with the presentation. The presentation file and the associated information are stored in the storage unit 104. The associated location may be GPS coordinates corresponding to the venue of the presentation (e.g. a lecture hall). The associated perspective direction may be a predetermined directional range of perspective direction of the presentation (e.g. within 20 degrees of the northerly direction). The associated presentation image may be an image associated with the presentation and may contain a logo of the presentation or information identifying the presentation.

Figure 3:
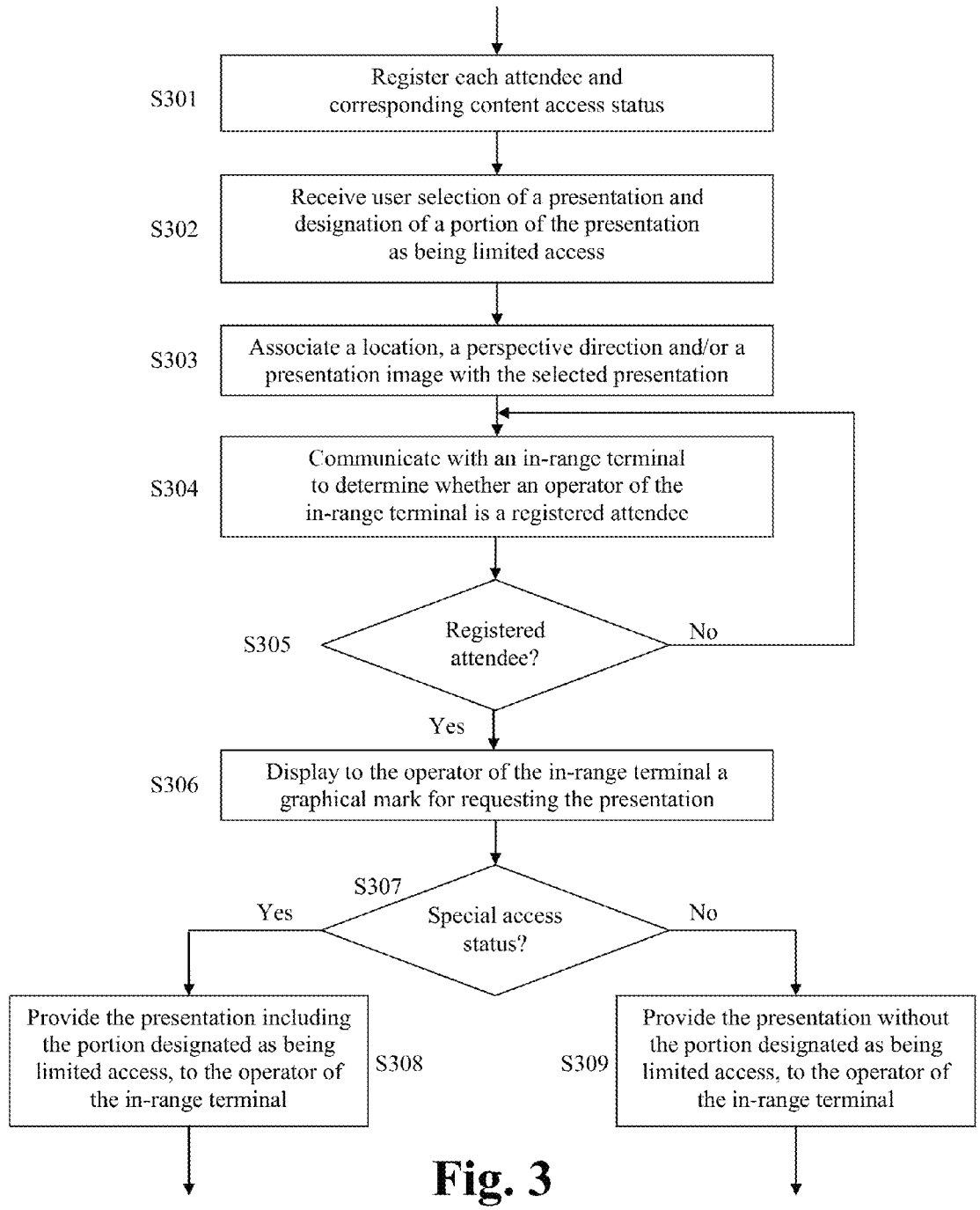
FIG. 3 shows a flowchart for a method of managing access by attendees to a presentation, in an exemplary embodiment.

The operation of the presentation management apparatus 103 is further described infra in connection with the example of FIG. 3.

The storage unit 104 may contain files uploaded by the terminals 101 and 102 or any data collected by the presentation management apparatus 103 (including presentation files and attendee registration information). The storage unit 104 is connected to the presentation management apparatus 103 via the network 105.

In an exemplary embodiment, the storage unit 104 may be an Intranet folder, locally connected to the other devices of the system 100. For example, such a configuration for the storage unit 104 may be used for meetings or seminars held within a company where attendees of such meetings or seminars can readily connect to and utilize resources on the intra-office network.

In another exemplary embodiment, the presentation management apparatus 103 may make the presentation files available to the attendees (e.g. via the Internet) without the attendees being connected to the intra-office network.

The network 105 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 105. In addition, the network 105 preferably uses TCP/IP (Transmission Control Protocol/Internet Protocol), but other protocols can also be used. How devices can connect to and communicate over the network 105 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

With reference to FIG. 1B, a presentation management system according to another exemplary embodiment is described below.

FIG. 1B shows a block diagram of a system 150 which includes a cloud network 151, a storage unit 152, a presentation management apparatus 153, and terminals 154 and 155.

In the system 150, the presentation management apparatus 153 and the storage unit 152 are implemented on the cloud network 151. The cloud network 151 may be a public cloud which represents a network in which a service provider makes resources, such as applications and storage, available to the general public over the Internet, or a virtual private cloud which is a private cloud existing within a shared or public cloud.

The storage unit 152 may be implemented using a public cloud offered by various public cloud providers. The storage unit 152 may also be any of a variety of web-based file hosting services.

The system 150 differs from the system 100 of FIG. 1A in that the presentation management apparatus 153 further contains a request location determining part 153d, which determines the physical location of the terminal 155 from which a request for the presentation file is received. The physical location of the terminal 155 may be determined by, for example, requesting the terminal 155 to transmit location data indicating the physical location of the terminal 155. The terminal 155 may be equipped with a location determining device configured to determine the physical location of the terminal 155. Alternatively, the request location determining part 153d may determine the physical location of the terminal 155 by analyzing the network address information contained in the presentation file request. In another exemplary embodiment, the request for the presentation file sent by the terminal 155 may already contain the physical location information of the terminal 155, and thus, the location of the terminal 155 can simply be extracted therefrom.

The operation of the request location determining part 153d is not limited to the aforementioned configurations, and may use other methods to determine the physical location of the terminal 155.

Otherwise, the operation of the system 150 is similar to that of the system 100 of FIG. 1A.

With reference to FIG. 1C, a presentation management system according to another exemplary embodiment is described below.

FIG. 1C shows a block diagram of a system 170 which includes a cloud network 171, a storage unit 172, an AR presentation part 173, and terminals 174 and 175. The terminal 174 includes an access status assignment part 174a and a content label part 174b.

In this exemplary embodiment, the access status assignment part 174 and the content label part 174b reside on the terminal 174, rather than within the presentation management apparatus, as shown in FIGS. 1A and 1B. Thus, for example, application of a special content mark to designate a selected portion of a presentation as being limited access is performed locally on the terminal 174 by the content label part 174b.

Otherwise, the operation of the system 170 is similar to that of the system 150 of FIG. 1B.

With reference to FIG. 1D, a presentation management system according to another exemplary embodiment is described below.

FIG. 1D shows a block diagram of a system 190 which includes a cloud network 191, a storage unit 192, a presentation management apparatus 193 and terminals 194 and 195. The presentation management apparatus 193 provides to the terminal 194 a presentation management application 193a, an access status assignment unit 193a-1, a control label unit 193a-2, an AR presentation unit 193a-3 and a user interface 193a-4, and provides to the terminal 195 a presentation management application 193b and a user interface 193b-1.

As shown in FIG. 1D, the terminal 194 provides login credentials, a presentation file its associated information (e.g. location, viewing direction and presentation image) and attendee registration information to the presentation management apparatus 193, and the terminal 195 provides login credentials, a physical location, a viewing direction, and an image capture of the terminal 195 to the presentation management apparatus 193.

In this exemplary embodiment, tasks such as registering the attendees, configuring the content access status of each attendee, designating a portion of the presentation as being limited access and uploading the presentation along with associated information, are performed through the user interface 193a-4 provided by the presentation management apparatus 193. For example, a user (i.e. presenter) of the terminal 194 inputs attendee registration information (e.g. including a plurality of attendees and corresponding content access statuses) via the user interface 193a-4, and the access status assignment part 193a-1 registers the received attendee registration information in the storage unit 192.

Further, the terminal 195 (i.e. the attendee) communicates with the presentation management apparatus 193 via the user interface 193b-1. The information necessary to access data stored in the storage unit 192 is received by the presentation management apparatus 193 via the user interface 193b-1. The data retrieved from the storage unit 192 (e.g. a presentation file) may be displayed via a display device (not shown) on the terminal 195. Further, the data retrieved from the storage unit 192 may be utilized to generate graphical or textual data to be displayed on the terminal 195. For example, the presentation management apparatus 193 may transmit to the terminal 195 information about the presentation, such as the number of people who have accessed the presentation file so far, or announcements made to the attendees. Such information may be displayed on the terminal 195 throughout the presentation.

Otherwise, the operation of the system 190 is similar to that of the system 150 of FIG. 1B.

Figure 2A:
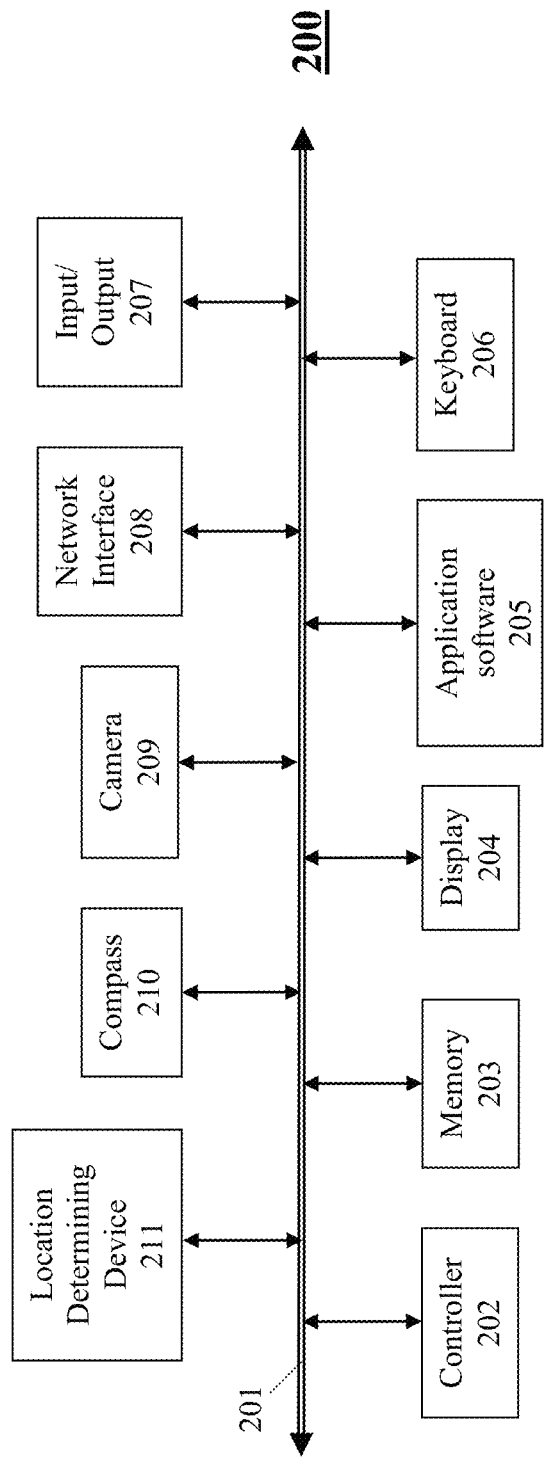
FIG. 2A shows a block diagram of an exemplary configuration of a terminal, such as in the systems shown in FIGS. 1A-1D.

An example of a configuration of the mobile devices 101 and 102 of FIG. 1A is shown schematically in FIG. 2A. In FIG. 2A, terminal device 200 includes a controller (or central processing unit) 202 that communicates with a number of other components, including memory 203, display 204, application software 205, keyboard (and/or keypad) 206, other input/output (such as mouse, touchpad, stylus, microphone and/or speaker with voice/speech interface and/or recognition software, etc.) 207, network interface 208, camera 209, compass 210 and location determining device 211, by way of an internal bus 201.

The memory 203 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 208 provides a connection (for example, by way of an Ethernet connection or other network connection which supports any desired network protocol such as, but not limited to TCP/IP, IPX, IPX/SPX, or Net-BEUI) to network 401.

Application software 205 is shown as a component connected to the internal bus 201, but in practice is typically stored in storage media such as a hard disk or portable media, and/or received through the network 105, and loaded into memory 203 as the need arises. The application software 205 may include applications for utilizing other components connected to the internal bus 201, such as a camera application or a compass application.

The camera 209 is, for example, a digital camera including a series of lenses, an image sensor for converting an optical image into an electrical signal, an image processor for processing the electrical signal into a color-corrected image in a standard image file format, and a storage medium for storing the processed images.

The series of lenses focus light onto the sensor [e.g. a semiconductor device such as a charge-coupled device (CCD) image sensor or a complementary metal-oxide-semiconductor (CMOS) active pixel sensor] to generate an electrical signal corresponding to an image of a scene. The image processor then breaks down the electronic information into digital data, creating an image in a digital format. The created image is stored in the storage medium (e.g. a hard disk or a portable memory card).

The camera 209 may also include a variety of other functionalities such as optical or digital zooming, auto-focusing and HDR (High Dynamic Range) imaging.

Figure 2B:
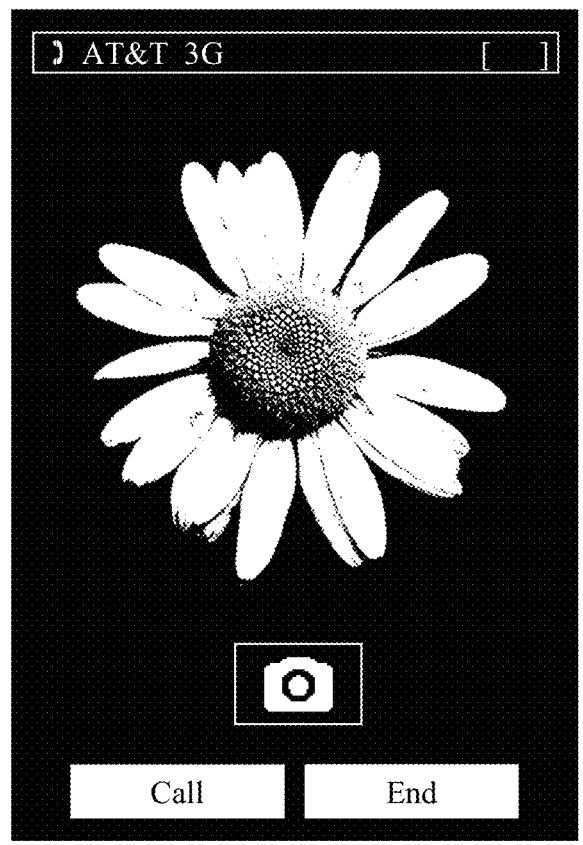
FIG. 2B shows an image showing a camera functionality of the terminal shown in FIG. 2A, according to an exemplary embodiment.

FIG. 2B shows an example of the camera function on a mobile device.

As shown in FIG. 2B, the camera captures an image of what is in front of it. Here, the camera lens of the mobile device is aimed at a flower. When the user of the mobile device presses the shutter (the box with a camera icon), the current image will be captured and stored as an image file on the mobile device.

The compass 210 is used to generate a directional orientation of the terminal device 200. That is, if the terminal device 200 is held such that it faces a certain direction, the compass 210 generates one particular reading (e.g. 16° N), and if the terminal device 200 is turned to face another direction without changing its location, the compass 210 generates another reading different from the earlier one (e.g. 35° NE).

The compass 210 is not itself an inventive aspect of this disclosure, and may be implemented in any of various known approaches. For example, the compass may include one or more sensors for detecting the strength or direction of magnetic fields, such as by being oriented in different directions to detect components of the Earth's magnetic field in different directions and determining a total magnetic field vector, thereby determining the orientation of the terminal device 200 relative to the Earth's magnetic field.

In another exemplary embodiment, the compass 210 may be implemented using a gyroscope (a spinning wheel whose axle is free to take any orientation) whose rotation interacts dynamically with the rotation of the earth so as to make the wheels process, losing energy to friction until the axis of rotation of the gyroscope is parallel with the Earth's rotation.

In another exemplary embodiment, a GPS receiver having two antennas, which are installed some fixed distance apart, may be used as the compass 210. By determining the absolute locations of the two antennas, the directional orientation (i.e. from one antenna to the other) of the terminal device 200 can be calculated.

The configuration of the compass 210 is not limited to the aforementioned implementations and may include other means to determine the directional orientation of the terminal device 200.

The location determining device 211 determines a physical location of the terminal device 211. For example, the location determining device 211 may be implemented using a GPS receiver configured to receive signals transmitted by a plurality of GPS satellites and determine the distance to each of the plurality of GPS satellites at various locations. Using the distance information, the location determining device 211 can deduce the physical location of the terminal device 200 using, for example, triangulation.

In another exemplary embodiment, a similar deduction of the physical location can be made by receiving signals from several radio towers and calculating the distance from the terminal device 211 to each tower.

The configuration of the location determining device 211 is not limited to the aforementioned implementations and may include other means to determine the physical location of the terminal device 200.

Figure 2C:
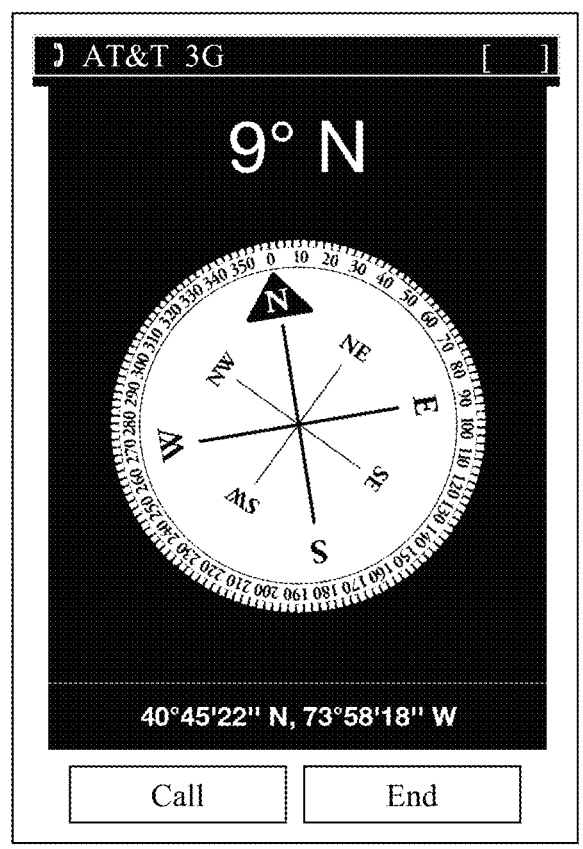
FIG. 2C shows an image showing compass and GPS functionalities of the terminal shown in FIG. 2A, according to an exemplary embodiment.

FIG. 2C shows an example of the compass and GPS function on a mobile device.

As shown in FIG. 2C, a degree ("9°") and a direction ("N") are displayed to show to which direction the mobile device is being pointed. In addition, the GPS coordinates ("40° 45'22" N, 73° 58'18"W") of the mobile device is displayed at the bottom of the screen. The GPS coordinates correspond to a live location of the mobile device, and thus the coordinates are updated as the user moves the location of the mobile device.

Depending on the type of the particular terminal device, one or more of the components shown in FIG. 2A may be missing or connected externally. For example, a particular mobile phone may be missing the keyboard 206, but another keyboard may be connected to the mobile phone externally. Similarly, a particular desktop computer may, for example, have an external camera device (similar to the camera 209 described above) connected thereto.

Additional aspects or components of the terminal device 200 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

With reference to FIG. 3, a method for managing access by a plurality of attendees through a network to a presentation (utilized by, for example, the presentation management apparatus 103 of FIG. 1A) is described below.

In the example shown in FIG. 3, the access status assignment part 103a of the presentation management apparatus 103 registers each attendee and corresponding content access status in an attendee database (step S301). The registration of attendees may occur at the venue of the presentation (e.g. in the morning of the conference in which the presentation is to take place), or in advance using pre-registration forms. Then, the content label part 103b of the presentation management apparatus 103 applies a special content mark to a selected portion of a presentation, to designate the selected portion of the presentation as being limited access. For example, the special content mark may be applied to a presentation file that the presenter wishes to upload, or to a presentation file that is already stored in the storage unit 104.

The AR presentation part 103c of the presentation management apparatus 103 uploads the presentation file (e.g. a Microsoft PowerPoint document) along with information regarding a location, a perspective direction and/or a presentation image associated with the presentation (step S303). The location may be GPS coordinates corresponding to the venue of the presentation (e.g. a lecture hall). The perspective direction may be a predetermined directional range of perspective direction of the presentation. For example, if the attendees are to face the presenter in a northerly direction during the presentation, that general direction is stored in association with the presentation file. The presentation image may be an image associated with the presentation and may contain a logo of the presentation or information identifying the presentation.

In FIG. 4A, a database of files according to an exemplary embodiment is shown.

As shown in FIG. 4A, the database maintains a list uploaded files ("file name"), along with information regarding each of the uploaded files, including whether the file has any limited access pages ("limited access pages"), a location associated with the file ("location"), a perspective direction associated with the file ("perspective direction") and an image associated with the file ("image").

The file name indicates the name of the file that the presenter uploaded to the storage unit 104 via the presentation management apparatus 103.

The limited access pages indicate the pages that are designated as being limited access (i.e. requiring a special access status to access the pages). The limited access pages are either automatically retrieved from the uploaded file by searching the file for indicators of limited access (e.g. a VIP stamp) or specified by the presenter when the file is uploaded. For automatic retrieval of limited access pages conventional pattern recognition algorithms can be used (i.e. look for pages stamped with a predetermined symbol).

Alternatively, instead of maintaining the page numbers or slide numbers of the limited access pages, the storage unit 104 may simply maintain the original files and make any necessary determination as to whether limited access pages exist, at the time the files are accessed by attendees.

The location information shown in FIG. 4A represents GPS coordinates of the various locations associated with the uploaded files. However, associated location information is not limited to such a format, and can include any of zip codes, building names, IP addresses, country names, room numbers and etc. The storage unit 104 may also maintain a map (i.e. office map, campus map, etc.) in a case that, for example, room numbers or building names are used as location information to compare locations. The location information may also include a range of location information. For example, a range of GPS coordinates can be associated with a particular presentation file.

The perspective direction indicates a viewing direction associated with the file. For example, if a presentation is set up such that the attendees are to view the presentation at a certain specified range of viewing angles (e.g. within 20 degrees of the northerly direction, 0° N), such viewing direction is associated with the uploaded presentation file.

The images associated with the files may be an actual image file uploaded with the presentation file and stored in the storage unit 104, or may also be a link to an image file located, for example, on the Web.

Referring back to FIG. 3, it should be noted that the uploading of the presentation file or the designation of a portion thereof as being limited access may occur, for example, before the registration of the attendees in step S301. The example shown in FIG. 3 is merely an exemplary embodiment, and the operation of the presentation management apparatus 103 is not limited to the order in which one or more of the steps are shown to be performed in FIG. 3.

Once the received presentation file is uploaded along with its associated information, the AR presentation part 103c communicates with an in-range terminal (e.g. a mobile device of an attendee) to determine whether an operator (e.g. the attendee) of the in-range terminal is a registered attendee (step S304). If the operator of the in-range terminal is a registered attendee (S305, YES), a graphical mark for requesting the presentation is displayed to the registered attendee via the in-range terminal (step S306). In another exemplary embodiment, as discussed infra in connection with FIG. 7, the presenter can configure the presentation management apparatus 103 such that all attendees may have access to the presentation file, not just the registered attendees.

In another exemplary embodiment, the graphical mark for requesting the presentation may be displayed to the registered attendee only if the physical location of the in-range terminal is within a prescribed range of the location of the presentation. For example, the location of the in-range terminal is determined by a GPS application on the in-range terminal, and the AR presentation part 103c determines whether the location of the in-range terminal determined by the GPS application is within the prescribed range (e.g. within 30 feet of the building in which the conference is held) of the location of the presentation. By requiring the requesting attendees to be at the location of the presentation in order to access the presentation file, the presenter can deny access to attendees (registered or not) who did not show up to the presentation. For example, if a professor for a class wishes to allow only those students who attend his or her lecture to be able to access the answers to the homework assignment of the day, the professor can use this feature to prevent the students who did not show up to class from accessing such content.

FIG. 6C shows two examples of the location comparison, according to an exemplary embodiment. As shown in FIG. 6C, the presentation is associated with a predetermined range of GPS coordinates ("40.7585–40.7604, 73.9767–73.9812"). The request location (i.e. physical location of the in-range terminal of the attendee) is compared to the range, and if it is determined that the request location is within the range, the graphical mark for requesting the presentation may be displayed on the in-range terminal of the attendee (or, the presentation file may be provided to the in-range terminal). As evident in FIG. 6C, the first request location ("40.7590, 73.9784") is within the range, and the second request location ("40.7602, 73.9874") is not.

In another exemplary embodiment, the graphical mark for requesting the presentation may be displayed to the registered attendee only if a viewing direction of the in-range terminal, measured by a compass application of the in-range terminal, is within a prescribed directional range of the perspective direction associated with the presentation (e.g. within 20 degrees of the northerly direction). Such a feature allows the presenter to further control access to the presentation file.

FIG. 6D shows two examples of the directional comparison, according to an exemplary embodiment. As shown in FIG. 6D, the presentation is associated with a predetermined range of perspective direction ("2° N-42° NE"). The viewing direction of the in-range terminal of the attendee is compared to the range, and if it is determined that the viewing direction is within the range, the graphical mark for requesting the presentation may be displayed on the in-range terminal of the attendee (or, the presentation file may be provided to the in-range terminal). As evident in FIG. 6D, the first viewing direction ("32° NE") is within the range, and the second request location ("119° SE") is not.

In another exemplary embodiment, the graphical mark for requesting the presentation may be displayed to the registered attendee only if a current image capture of a camera application on the in-range terminal matches the presentation image associated with the presentation. For example, a logo or a sign associated with the presentation may be on display at the presentation location. If the attendee holds the in-range terminal such that the logo or sign is captured by the camera application, the image capture can be compared to the presentation image to verify that the attendee is in fact at the presentation.

FIG. 6E shows two examples of the image comparison, according to an exemplary embodiment. As shown in FIG. 6E, two associated images, which are associated with two different presentations, are compared to image captures of the in-range terminals. The image comparison can be done using any of a variety of image comparison algorithms. For example, the images can be compared using a block-based similarity check, wherein the images are partitioned into blocks of a specified pixel size. The color value of each of these blocks is calculated as the average of the color values of the pixels the block contains. The color value of each block of one image is checked against the color value of each block of the other image, keeping track of the percent similarity of the color values. For example, if the overall similarity is above a predetermined value, it is determined that the images match. In another exemplary embodiment, a keypoint matching algorithm [e.g. scale-invariant feature transform (SIFT)] may be used, where important features in one image, such as edges and corners, are identified and compared to those in the other image. Similarly, depending on the percent similarity of the features, whether the images match is determined.

If it is determined that the images match, the graphical mark for requesting the presentation may be displayed on the in-range terminal of the attendee (or, the presentation file may be provided to the in-range terminal). As evident in FIG. 6E, the first image capture matches the associated presentation image, while the second image capture does not.

Once the graphical mark for requesting the presentation file is displayed to the registered attendee via the in-range terminal, the attendee may request to access the presentation file by selecting the graphical mark. Upon such a request, it is determined whether the attendee has a special access status (step S307). For example, the special access status indicates that the attendee has access to a certain portion of the presentation file designated as being limited access. In another exemplary embodiment, there may also be several tiers of the special access status, each of which indicates the level of access granted to the attendee. For example, a VIP attendee may have a certain special access status that may be different from that of an organizing member of the presentation.

If it is determined that the attendee has a special access status (S307, YES), the AR presentation part 103c provides the attendee the presentation file, including the portion designated as being limited access, via the in-range terminal of the attendee (step S308). On the other hand, if it is determined that the attendee does not have a special access status (S307, NO), the AR presentation part 103c provides the attendee the presentation file without the portion designated as being limited access.

Figure 4B:
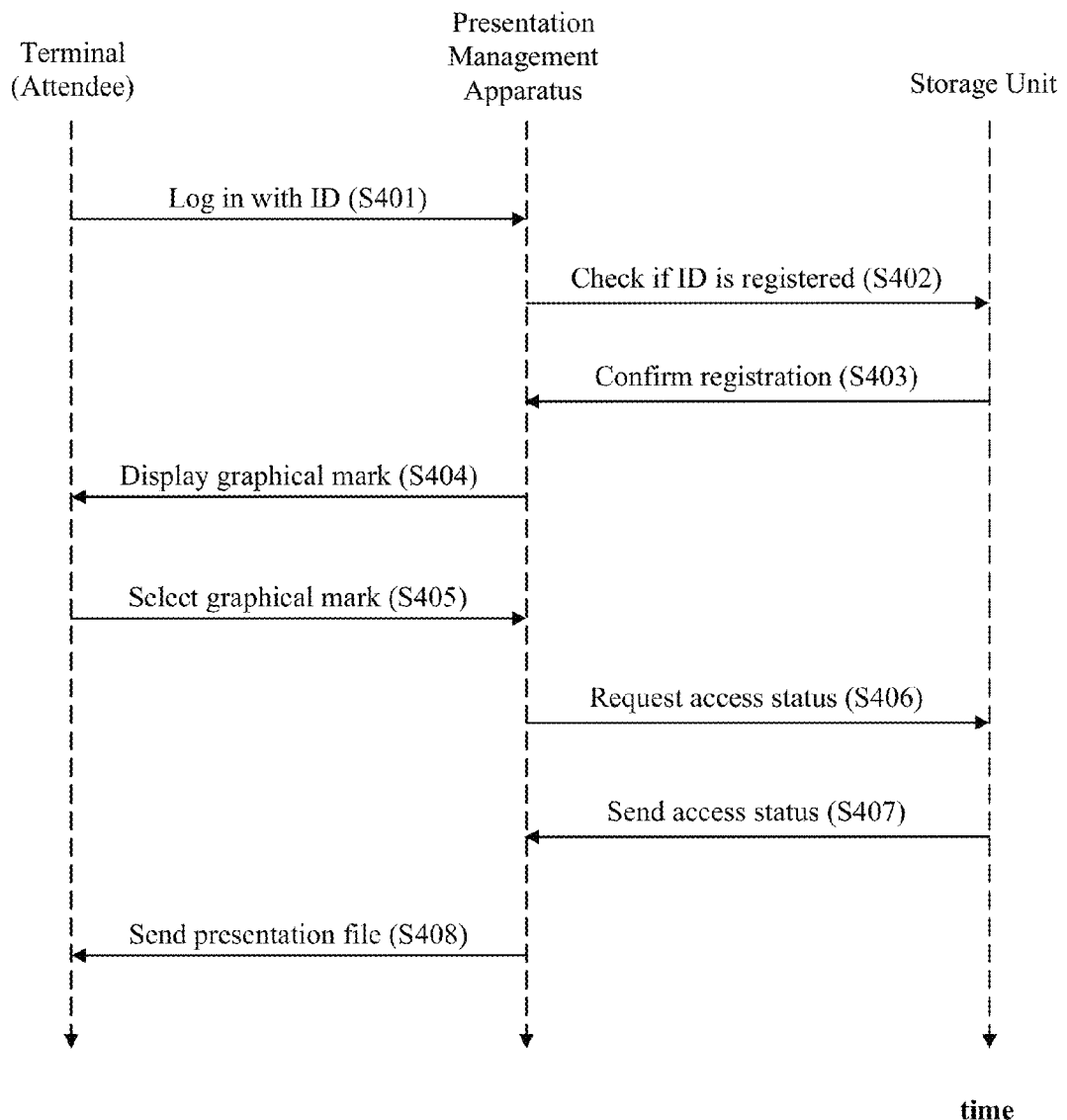
FIG. 4B shows a schematic representation of a workflow, according to an exemplary embodiment.

With reference to the example of FIG. 4B, the communication between the terminal 102 and the presentation management apparatus 103 is further described.

First, the attendee provides his or her login information (including login ID) to the presentation management apparatus 103 via the terminal 102 (step S401). The presentation management apparatus 103 uses the login information provided by the attendee to check whether the attendee is registered, by accessing the attendee database stored in the storage unit 104 (step S402). Upon receiving a confirmation from the storage unit 104 that the attendee is registered (step S403), the presentation management apparatus 103 causes a graphical mark for requesting a presentation file to be displayed on the terminal 102 (step S404). If the attendee requests to access the presentation file by selecting the graphical mark (step S405), the presentation management apparatus 103 requests a content access status of the attendee from the storage unit 104 (step S406). Based on the content access status received from the storage unit 104 (step S407), the presentation management apparatus 103 provides to the terminal 102 the presentation file (step S408). As discussed in connection with step S307 of FIG. 3, if the attendee has a special access status allowing the attendee to access portions of the presentation file designated as being limited access, the presentation management apparatus 103 provides the document In another exemplary embodiment, as shown in FIG. 4C, two versions of the presentation file are maintained in the storage unit 104, a first version with the portions designated as being limited access ("Faculty_Meeting_May_2012_ver1.ppt"), and a second version without the portions designated as being limited access ("Faculty_Meeting_May_2012_ver2.ppt"). The second version indicates that the limited access pages have been removed ("removed"). In such a case, if it is determined in step S307 of FIG. 3 that the attendee has a special access status, the first version of the presentation file is provided to the attendee, and otherwise, the second version of the presentation file is provided to the attendee.

Although, in FIG. 4B, the terminal 102 initiates the communication with the presentation management apparatus 103 by submitting the login information, in another exemplary embodiment, the presentation management apparatus 103 may initiate the communication by broadcasting to all devices on the network (i.e. within the broadcast domain).

Figure 5A:
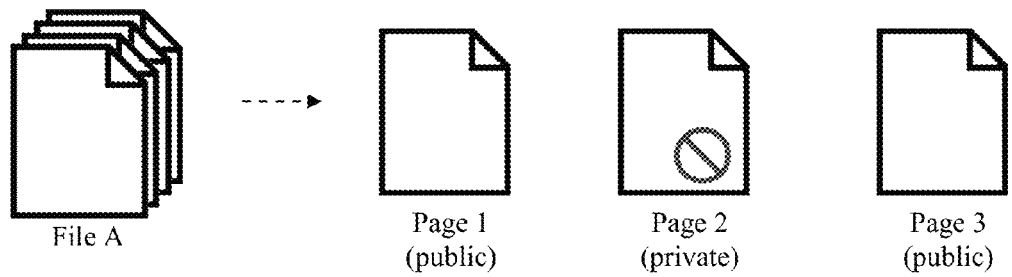
FIG. 5A shows illustrations of an original file and a retrieved file, according to an exemplary embodiment.
Figure 5A:
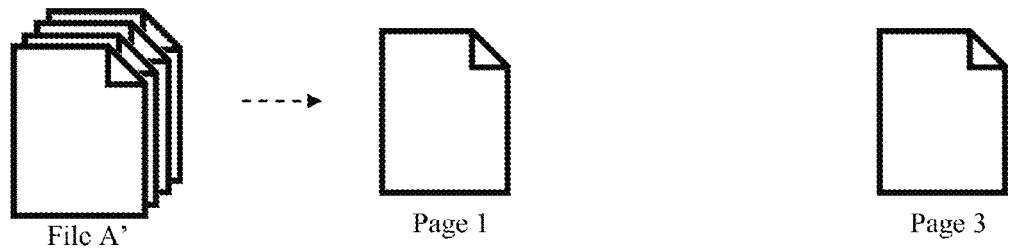
Figure 5B:
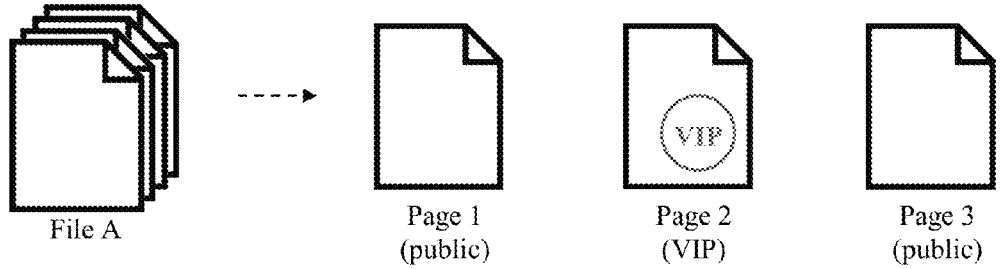
FIG. 5B shows illustrations of an original file and a retrieved file, according to another exemplary embodiment.
Figure 5B:
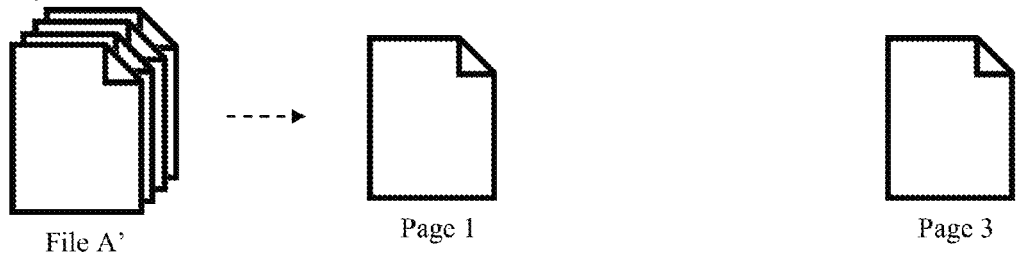
Figure 5B:
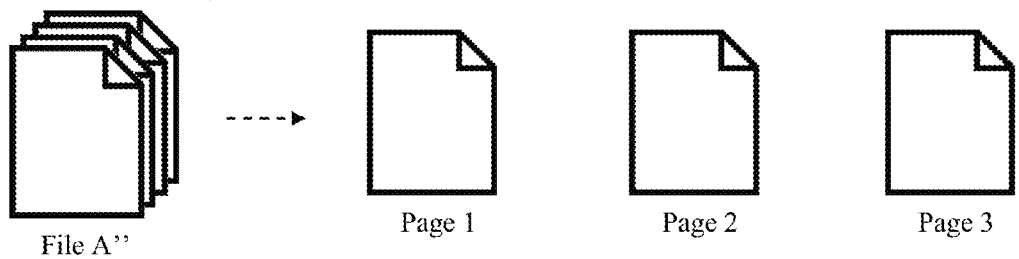

A method of designating a portion of the presentation as requiring special access status is illustrated in FIGS. 5A and 5B.

In the example of FIG. 5A, pages of an original file (A) and pages of a retrieved file (A') are shown. The pages 1 and 3 of the original file are indicated as public, and page 2 of the original file is stamped with a symbol, designating it as private. For example, such designation (i.e. stamping pages or slides with a symbol) can either be manual (i.e. the presenter goes through the file and stamps each page that he or she wishes to remain private with a symbol) or automatic (e.g. the presenter specifies to the presentation management apparatus 103 that page 2 is to be designated as private, and the content label part 103b of the presentation management apparatus 103 stamps page 2 with a symbol designating it as private).

Once a portion of the presentation file is designated as private (limited access), when the AR presentation part 103c provides the original file (A) to an attendee, the private pages (e.g. page 2) are removed before the file is provided to the attendee. As shown in FIG. 5A, the copy of the presentation file retrieved by the attendee (retrieved file A') is missing page 2 (i.e. the page designated as private).

However, the presenter may wish to provide a portion of the presentation file as being available to some attendees but not available to other attendees. In another exemplary embodiment, as discussed in connection with the example of FIG. 3, a portion of the presentation file may be designated as being limited access (rather than completely private). Such portion can be made accessible to an attendee having a special access status. As illustrated in FIG. 5B, page 2 of the presentation is designated with a symbol "VIP", indicating that the page requires a special access status. As a result, the presentation file (File A') retrieved by a regular attendee is missing page 2, whereas the presentation file (File A") retrieved by a VIP attendee (e.g. an executive member of the company at an internal presentation) contains page 2.

The feature is useful because sometimes the presenter may not want people to have hard copies of (or see) certain portions of the presentation file. For example, a detailed description of a company's financial matters or certain multimedia content (e.g. sound or video files) contained in the presentation file may not be fit for public access. Such pages may even be skipped in the actual presentation. Thus, portions of the presentation containing such information may be designated with a special symbol so as to prevent such portions from being accessed by all attendees.

However, the presenter may still want some of the attendees to have access to such portions of the presentation file (e.g. VIPs or high level executives). In such a case, the attendees whom the presenter wishes to grant unrestricted access to the portions requiring a special access status, can be registered as having a special access status.

FIG. 6A shows an attendee database stored, for example, in the storage unit 104 of FIG. 1A. As shown in FIG. 6A, in this exemplary embodiment, the attendees are registered using their attendee IDs ("attendee ID"), along with their content access statuses ("status"). As discussed in connection with step S307 of FIG. 3, if an attendee requesting access to the presentation does have a special access status (e.g. VIP status), the AR presentation part 103c, for example, provides the attendee the presentation file including the portion designated as being limited access.

As briefly discussed in connection with step S307 of FIG. 3, several tiers of special access statuses can also be implemented, in another exemplary embodiment. For example, at a company meeting, people from different departments within the company, such as technology, accounting, marketing and sales, may be present. The special access status may be particularized based on the department to which a particular attendee belongs. For example, attendees from the accounting department may have access to those pages marked "accounting" and attendees from the technology department may have access to those pages marked "technology", wherein above all, an attendee who is a high-level executive of the company may have access to the entire presentation file (i.e. including those portions marked "accounting", "technology" and etc.).

Figure 6B:
FIG. 6B shows a method of verifying a special access status of an attendee, according to an exemplary embodiment.
Figure 6B:

With reference to FIG. 6B, a method for verifying whether a registered attendee has a special access status is described.

In an exemplary embodiment, a business card of the attendee can be used to verify the special access status of the attendee. For example, the attendee can take a picture of his or her business card using a camera application on the in-range terminal of the attendee, and the picture can be utilized by a presentation management mobile application (e.g. a mobile application designed to provide the presentation management service described in the present disclosure) to verify the special access status of the attendee. For example, an optical character recognition (OCR) may be performed on the image capture of the business card of the attendee, and the presentation management mobile application determines whether the business card contains any of the predetermined set of terms such as, for example, "executive", "director" and "CEO". If the business card does contain such terms that are traditionally associated with high-level executives (or those terms which are predetermined by the presenter), the verification is successful. On the other hand, if the business card contains terms such as "junior" and "associate", the verification may be deemed unsuccessful.

Upon successful verification of the special access status of the attendee using the picture, a notification is displayed on the in-range terminal of the attendee, indicating that the verification was successful ("YES"). On the other hand, if the special access status of the attendee cannot be verified, a notification is displayed on the in-range terminal of the attendee, indicating that the verification was not successful ("NO").

The method for verifying a special access status of a registered attendee is not limited to the aforementioned method, and a variety of verification methods can be used, including the use of pre-registered login credentials or one or more biometrics means such as comparing fingerprints, palm prints, voice or speech, retinas or irises, facial expressions or features, signature and etc.

Figure 7:
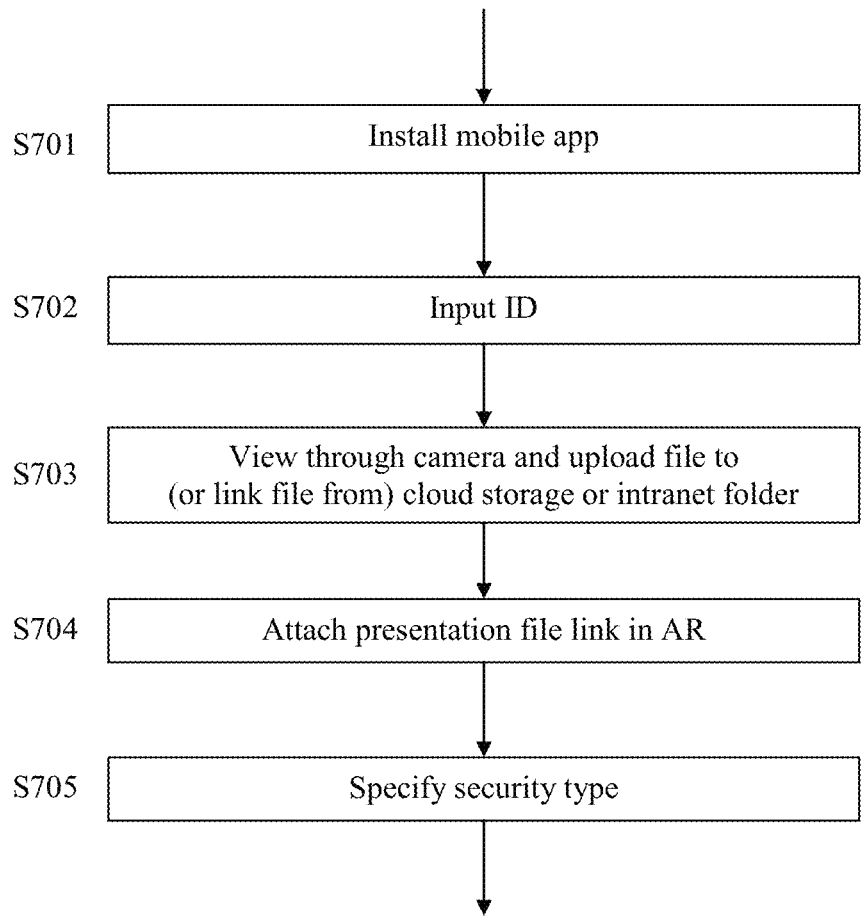
FIG. 7 shows a flowchart for a method of uploading a presentation, according to an exemplary embodiment.

With reference to FIG. 7, an exemplary method for attaching a presentation file to a presentation in an office conference room is described.

A presenter installs on his or her mobile device a mobile application for providing the presentation management services discussed in the present application (step S701), and the presenter inputs his or her ID (step S702). The mobile application may be downloaded from an online store for mobile applications, such as Android Market, App Store, etc., depending on the operating system installed on the mobile device (e.g. iOS, Android, BlackBerry®, Windows® Phone, etc.). Once the presenter is successfully logged in, the user ID of the presenter is saved, and the presenter can upload a presentation file or associate an already uploaded file with the presentation.

Figure 8A:
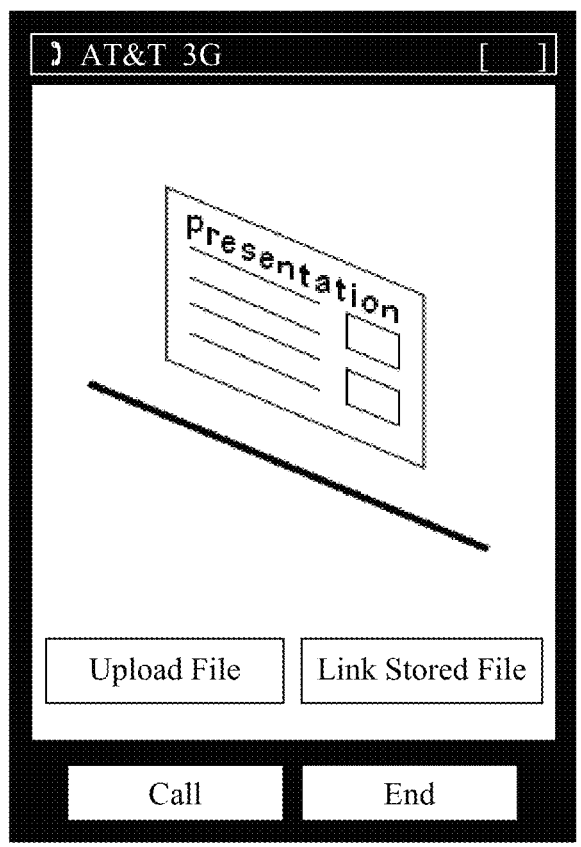
FIG. 8A shows a screenshot of a mobile device, according to an exemplary embodiment.

For example, as illustrated in FIG. 8A, in an exemplary embodiment, the presenter can face the camera lens of his or her mobile device towards the presentation screen (step S703), and press the "upload file" button to upload a new file to a storage unit (e.g. on a cloud network or in an Intranet folder), or the "link stored file" to associate the presentation with an already stored file (step S704). For example, the presentation management mobile application, when the presentation file is uploaded, retrieves the GPS coordinates and the compass reading and takes a picture to associate the collected information with the presentation file uploaded. Such information can be stored in the database and later used to determine whether a particular attendee has access to the presentation file.

Once the presentation file is selected, the presenter specifies a security type of the presentation (step S705). For example, the presentation file may be accessed by any attendee as long as the attendee is in the room or nearby.

Alternatively, the presenter can indicate that any attendee who is in or near the room may access the presentation file upon the approval of the presenter. For example, every time an attendee requests to access the presentation file, the presenter will receive a notification on his or her mobile device, requesting the presenter to either approve or deny the access request from the attendee. Upon an approval by the presenter, the presentation file can be accessed from the in-range terminal (e.g. mobile device) of the attendee.

In another exemplary embodiment, access to the presentation file can be restricted to pre-registered attendees identified by their respective IDs. After logging in using his or her ID, the attendee can access the presentation file if it is determined that the ID of the attendee matches one of the pre-registered IDs.

Figure 9:
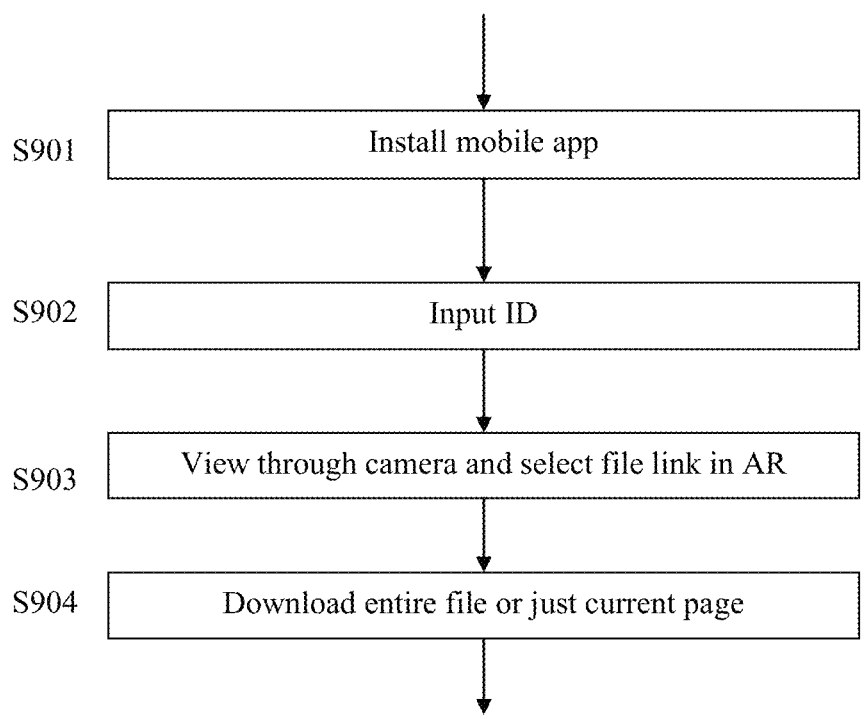
FIG. 9 shows a flowchart for a method of accessing a presentation, according to an exemplary embodiment.

With reference to FIG. 9, an exemplary method for accessing a presentation file to a presentation in an office conference room is described.

In a manner similar to that described with reference to FIG. 7, an attendee of a presentation can download on his or her in-range terminal (e.g. a mobile device) a mobile application for providing presentation management services including access to presentation files (step S901). Once the attendee inputs his or her ID (step S902) and is successfully logged in, the user ID of the attendee is saved, and the attendee can use the mobile application to retrieve the presentation file (step S903).

For example, the mobile application may use a GPS application to retrieve coordinates of the in-range terminal and compare the physical location of the in-range terminal to the location associated with the presentation to determine whether the attendee is in fact at the presentation. If it is determined that the attendee is in fact at the presentation, the presentation file is made available to the attendee. Thus, according to this exemplary embodiment, the attendee can access the presentation file without having to wait for the presenter to send the file.

In another exemplary embodiment, the mobile application may request that the attendee point the camera lens towards the presentation, and use a compass application of the in-range terminal to determine whether the viewing direction of the in-range terminal is within a predetermined directional range of the perspective direction of the presentation. If it is determined that the viewing direction is within the predetermined directional range, the presentation file is made available to the attendee.

In another exemplary embodiment, the mobile application may request that the attendee point the camera lens to a presentation image on display. The captured image can be compared to the predetermined image associated with the presentation to determine whether the attendee is in fact at the presentation. If it is determined that the attendee is in fact at the presentation, the presentation file is made available to the attendee.

In another exemplary embodiment, the attendee database may be searched to determine whether the ID of the attendee is among those indicated as having access to the presentation file. If it is determined that the ID of the attendee is in fact among those pre-registered as having access to the presentation file, the presentation file is made available to the attendee.

The aforementioned methods and/or other methods can also be used in combination.

Once the attendee is allowed to access the presentation file, a link to the presentation file will be displayed on the in-range terminal of the attendee, and the attendee may further be given an option of accessing the entire file or accessing just the current slide of the presentation (step S904).

Figure 8B:
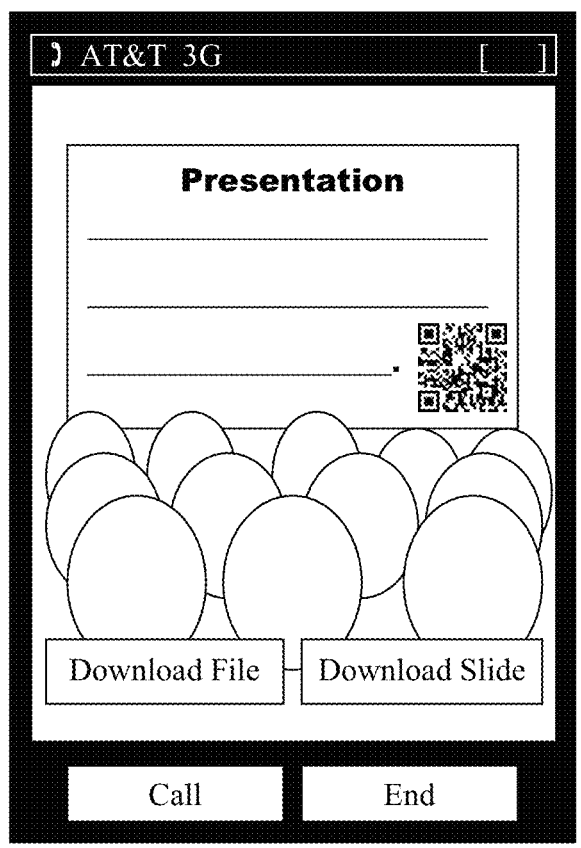
FIG. 8B shows another screenshot of a mobile device, according to an exemplary embodiment.

For example, FIG. 8B shows a screenshot taken from a mobile phone of an attendee. If the attendee wishes to access just the current slide, the attendee faces the camera of the mobile phone towards the presentation slide, and it is determined whether a current image capture of the camera application on the mobile device of the attendee matches a QR code (shown at the bottom right corner of the slide in FIG. 8B) that is placed on the slide. If the current image capture of the camera application matches the QR code provided on the slide, the particular slide can be accessed from the mobile device of the attendee (e.g. by downloading the particular slide). As shown in FIG. 8B, a button for accessing the entire presentation file ("download file") and a button for accessing just the current slide of the presentation ("download slide") have appeared on the screen. The attendee can simply access the current slide by pressing the "download slide" button.

Figure 10:
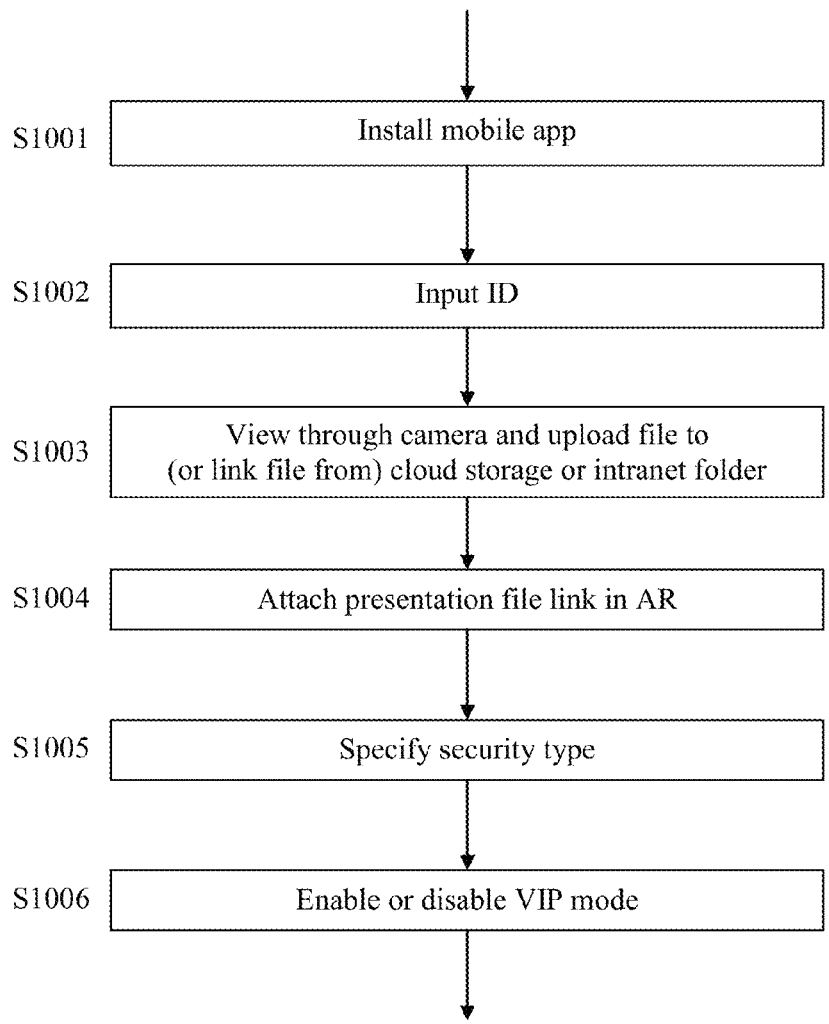
FIG. 10 shows a flowchart for a method of uploading a presentation, according to another exemplary embodiment.

With reference to FIG. 10, an exemplary method for attaching a presentation file to a presentation at a public show is described.

The steps S1001-S1005 are similar to steps S701-S705 described with reference to the example of FIG. 7. In this exemplary embodiment, after specifying a security type (step S1005), the presenter can also enable or disable a VIP mode (step S1006). As discussed with reference to FIG. 5B, when the VIP mode is enabled, a VIP attendee (i.e. an attendee with a special access status) can access the entire presentation file including the portions designated as being limited access (e.g. with a VIP stamp), while a regular attendee (i.e. an attendee without a special access status) cannot access the portions designated as being limited access.

As described with reference to FIG. 6B, the business card of the attendee can be used to verify the identity of the attendee with a special access status. In addition, other verification methods such as pre-registered login credentials or one or more biometrics means such as comparing fingerprints, palm prints, voice or speech, retinas or irises, facial expressions or features, signature and etc. can be used.

Figure 11:
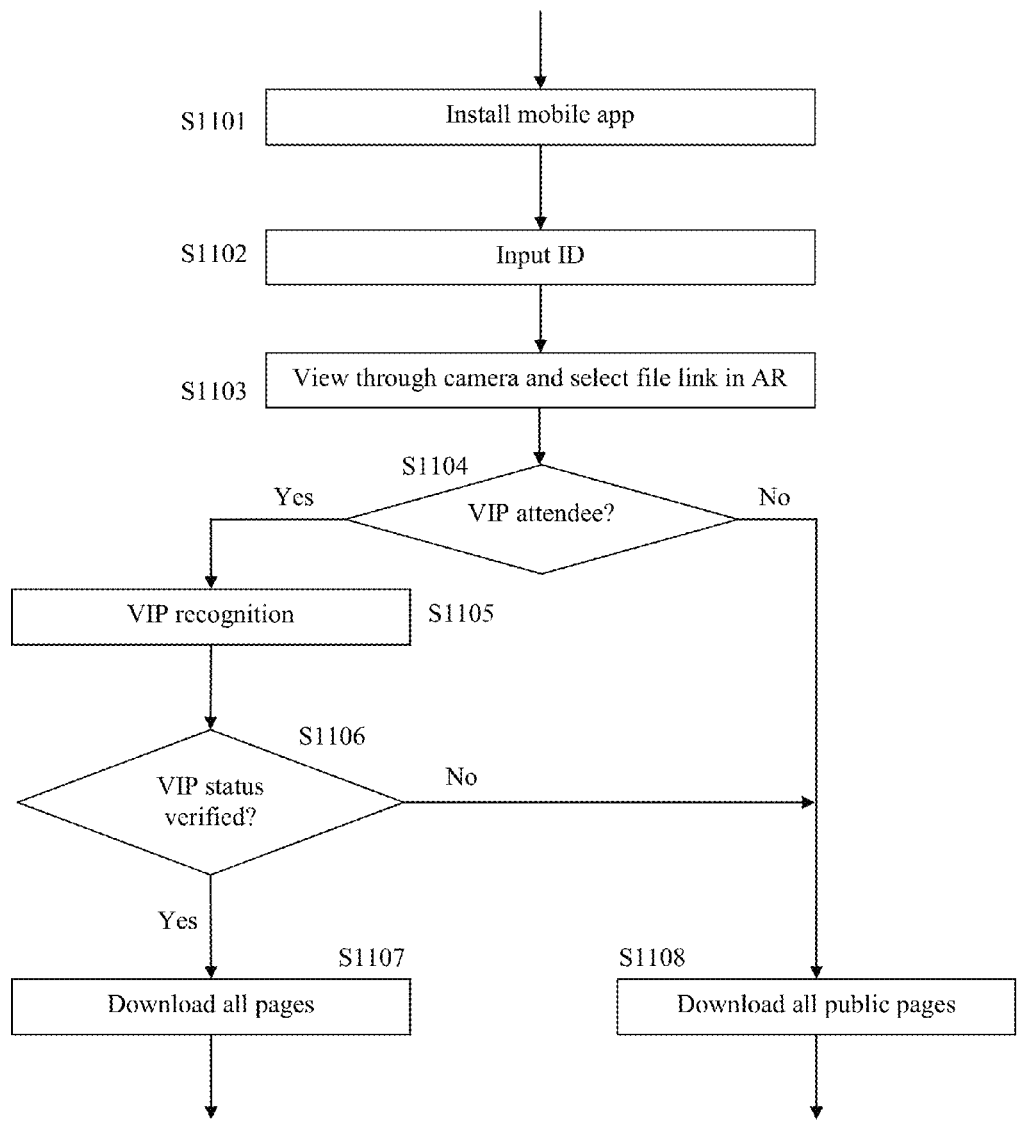
FIG. 11 shows a flowchart for a method of accessing a presentation, according to another exemplary embodiment.

With reference to FIG. 11, an exemplary method for accessing a presentation file to a presentation at a public show in which a VIP mode is enabled is described.

The steps S1101-S1103 are similar to steps S901-S903 described with reference to the example of FIG. 9. In addition, in this exemplary embodiment, the attendee is asked whether he or she is an attendee with VIP access (i.e. a special access status) (step S1104). If the attendee indicates that he or she is not an attendee with VIP access (S1104, NO), the presentation file without the portions designated as being limited access is provided to the in-range terminal (e.g. a mobile device) of the attendee (step S1108).

On the other hand, if the attendee does indicate that he or she is an attendee with VIP access (S1104, YES), the attendee may be asked to providing information necessary to verify the special access status of the attendee (step S1105). As discussed above, a variety of methods, including taking a picture of the business card of the attendee, may be used to verify the special access status of the attendee. While the verification process is taking place, the in-range terminal of the attendee may start downloading the portion of the presentation file not designated as being limited access.

Once the VIP access status of the attendee is verified (S1106, YES), the presentation file including the portions designated as being limited access is provided to the in-range terminal of the attendee. However, in a case that the VIP access status of the attendee cannot be verified (S1106, NO), the attendee is treated as if he or she does not have a special access status, and the presentation file without the portions designated as being limited access is provided to the in-range terminal of the attendee (step S1108).

In another exemplary embodiment, a database for keeping tracking of which attendees have accessed the presentation file may be maintained, as shown in FIG. 6A. The table in FIG. 6A shows the IDs of the registered attendees ("attendee ID"), the content access status of each registered attendee ("status"), whether the public pages of the presentation file have been provided to the attendees ("public pages provided"), and whether the restricted (i.e. private or VIP-access) pages of the presentation file have been provided to the attendees ("restricted pages provided"). As shown in FIG. 6A, such a table can be used to keep track of which of the VIPs (or other guests important to the presenter) have attended the presentation.

In another exemplary embodiment, step S1104 of FIG. 11 may involve automatically determining (i.e. without prompting the attendee to input whether he or she has VIP access) whether an attendee has a special access status by referring to the attendee database containing attendee registration information, and proceeding to step S1105 or S1108 depending on whether the attendee has a special access status.

As with the example of FIG. 9, the attendee is given an option to access just the current slide of the presentation, for example, by pointing the camera on the in-range terminal towards the QR code (or some other sign or symbol) provided on the current slide. Upon successful matching of the image capture of the camera and the QR code, the current slide is made available to the in-range terminal of the attendee.

The above-mentioned embodiments and examples are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A presentation management system configured to manage access by a plurality of attendees through a network to a presentation, said presentation management system comprising:
   an access status assignment part that registers the plurality of attendees and, for each specific attendee amongst the plurality of attendees, a content access status of the specific attendee;
   a content label part that applies a special content mark to a selected portion of a presentation, to designate said selected portion of the presentation as being limited access; and
   an augmented-reality (AR) presentation part that uploads presentation data for the presentation and at least one of (i) an associated location, (ii) an associated perspective direction and (iii) an associated presentation image, communicates with an in-range terminal to determine whether an operator of the in-range terminal is a registered attendee amongst the plurality of attendees, and in a case that the operator of the in-range terminal is said registered attendee, causes the in-range terminal to display a graphical mark for requesting the presentation and when the graphical mark is selected, causes the presentation data to be provided on the in-range terminal,
   wherein in a case that the operator of the in-range terminal has a content access status that is a special access status, the AR presentation part provides to the in-range terminal the presentation data including data of the selected portion that is designated as being limited access, and
   in a case that the operator of the in-range terminal does not have the content access status that is a special access status, the AR presentation part provides to the in-range terminal some of the presentation data and does not provide the data of the selected portion that is designated as being limited access.

2. The presentation management system of claim 1, further comprising:
   a request location determining part that determines a physical location of the in-range terminal, wherein
   the AR presentation part determines whether the physical location of the in-range terminal is within a prescribed range of the associated location of the presentation, and
   in a case that the physical location of the in-range terminal is not within a prescribed range of the associated location of the presentation, the AR presentation part does not provide the presentation data to the in-range terminal.

3. The presentation management system of claim 1, wherein
   the in-range terminal includes at least one of a camera application and a compass application, that determines a viewing direction of the in-range terminal, and wherein the AR presentation part communicates with the in-range terminal to determine whether the viewing direction of the in-range terminal is within a predetermined directional range of the associated perspective direction of the presentation, and in the case that the viewing direction of the in-range terminal is not within a predetermined directional range of the associated perspective direction of the presentation, the presentation data is not provided to the in-range terminal.

4. The presentation management system of claim 1, further comprising:

a request location determining part that determines a physical location of the in-range terminal, wherein the AR presentation part determines whether the physical location of the in-range terminal is within a prescribed range of the associated location of the presentation, and in the case that the physical location of the in-range terminal is not within a prescribed range of the associated location of the presentation, the AR presentation part does not cause the in-range terminal to display the graphical mark associated with the presentation.

5. The presentation management system of claim 1, wherein the in-range terminal includes at least one of a camera application and a compass application, that determines a viewing direction of the in-range terminal, and wherein the AR presentation part communicates with the in-range terminal to determine whether the viewing direction of the in-range terminal is within a predetermined directional range of the associated perspective direction of the presentation, and in the case that the viewing direction of the in-range terminal is not within a predetermined directional range of the associated perspective direction of the presentation, the AR presentation part does not cause the in-range terminal to display the graphical mark associated with the presentation.

6. The presentation management system of claim 1, wherein the in-range terminal includes a camera application, and the AR presentation part communicates with the in-range terminal to determine whether a current image capture of the camera application matches the associated presentation image of the presentation, and in a case that the current image capture of the camera application does not match the associated presentation image of the presentation, the AR presentation part does not cause the in-range terminal to display the graphical mark associated with the presentation.

7. The presentation management system of claim 1, wherein the in-range terminal includes at least one of a camera application and a compass application, that determines a viewing direction of the in-range terminal, the AR presentation part communicates with the in-range terminal to determine whether a physical location of the in-range terminal is within a prescribed range of the associated location of the presentation, and whether the viewing direction of the in-range terminal is within a predetermined directional range of the associated perspective direction of the presentation, and in a case that both (i) the physical location of the in-range terminal is within a prescribed range of the associated location of the presentation and (ii) the viewing direction of the in-range terminal is within a predetermined directional range of the associated perspective direction of the presentation, the presentation data is provided to the in-range terminal.

8. The presentation management system of claim 1, wherein the in-range terminal includes a camera application, a presentation request received by the presentation management system from the in-range terminal includes a current image capture of the camera application, and the AR presentation part performs an image comparison as between the current image capture of the camera application and the associated presentation image of the presentation, and in a case that the current image capture of the camera application does not match the associated presentation image of the presentation, the presentation data is not provided to the in-range terminal.

9. The presentation management system of claim 1, wherein the AR presentation part, upon upload of the presentation data, determines whether the presentation data includes a specific portion to which the special content mark has been applied to designate the specific portion as being limited access, and in a case that the AR presentation part determines that the presentation data includes the specific portion to which the special content mark has been applied, the AR presentation part generates a first version of the presentation data that includes the specific portion designated as being limited access and generates a second version of the presentation data that does not include the specific portion, and wherein in the case that the operator of the in-range terminal has a content access status that is a special access status, the AR presentation part provides to the in-range terminal the first version of the presentation data that includes the specific portion designated as being limited access, and in the case that the operator of the in-range terminal does not have the content access status that is a special access status, the AR presentation part provides to the in-range terminal the second version of the presentation data that does not include the specific portion.

10. The presentation management system of claim 1, wherein the AR presentation part determines whether the operator of the in-range terminal has the content access status that is the special access status, and determines whether the presentation data includes the selected portion to which the special content mark has been applied to designate the selected portion as being limited access, and when the AR presentation part determines that the operator of the in-range terminal has a content access status that is not the special access status, and determines that the presentation data includes the selected portion to which the special content mark has been applied to designate the selected portion as being limited access, the AR presentation part generates a version of the presentation data that does not include the selected portion, and transmits the version of the presentation data that does not include the selected portion to the in-range terminal.

11. The presentation management system of claim 1, wherein the AR presentation part maintains data indicating specific attendees that have received the presentation, and maintains data indicating special access attendees that have received the selected portion that is designated as being limited access.

12. The presentation management system of claim 1, wherein
the AR presentation part communicates with the in-range terminal to obtain user credentials of the operator of the in-range terminal, and determines based on the obtained user credentials whether the operator of the in-range terminal is a registered attendee, and
in a case that the AR presentation part determines that the operator of the in-range terminal is not a registered attendee, the presentation data is not provided to the in-range terminal.

13. The presentation management system of claim 1, wherein
the AR presentation part communicates with the in-range terminal to obtain user credentials of the operator of the in-range terminal, and determines based on the obtained user credentials whether the operator of the in-range terminal is a registered attendee, and
in a case that the AR presentation part determines that the operator of the in-range terminal is not a registered attendee, the presentation management system does not causes the in-range terminal to display the graphical mark for requesting the presentation.

14. A method for managing access by a plurality of attendees through a network to a presentation, said method comprising:
registering, in an attendee database, a plurality of attendees and, for each specific attendee amongst the plurality of attendees, a content access status of the specific attendee;
providing a user interface to a presenter terminal, for selecting a presentation from a data storage unit, and for designating a selected portion of the presentation as being limited access;
applying a special content mark to the selected portion of the presentation;
associating the presentation and at least one of (i) an associated location, (ii) an associated perspective direction and (iii) an associated presentation image;
communicating with an in-range terminal to determine whether an operator of the in-range terminal is a registered attendee amongst the plurality of attendees;
causing the in-range terminal to display a graphical mark for requesting the presentation in a case that the operator of the in-range terminal is a registered attendee;
causing presentation data for the presentation, including the selected portion that is designated as being limited access, to be provided to the in-range terminal, when the graphical mark is selected in a case that the operator of the in-range terminal has a content access status that is a special access status; and
causing the presentation data excluding the selected portion that is designated as being limited access to be provided to the in-range terminal, in a case that the operator of the in-range terminal does not have the content access status that is a special access status.

15. The method of claim 14, further comprising:
communicating with the in-range terminal to determine whether a physical location of the in-range terminal is within a prescribed range of the associated location of the presentation; and
causing at least one of (i) the presentation data not to be provided to the in-range terminal and (ii) the in-range terminal not to display the graphical mark associated with the presentation, in a case that the physical location of the in-range terminal is not within the prescribed range of the associated location of the presentation.

16. The method of claim 14, further comprising:
communicating with the in-range terminal to determine whether the viewing direction of the in-range terminal is within a predetermined directional range of the associated perspective direction of the presentation; and
causing at least one of (i) the presentation data not to be provided to the in-range terminal and (ii) the in-range terminal not to display the graphical mark associated with the presentation, in a case that the viewing direction of the in-range terminal is not within a predetermined directional range of the associated perspective direction of the presentation.

17. The method of claim 14, further comprising:
communicating with the in-range terminal to determine whether a current image capture of a camera application of the in-range terminal matches the associated presentation image of the presentation; and
causing at least one of (i) the presentation data not to be provided to the in-range terminal and (ii) the in-range terminal not to display the graphical mark associated with the presentation, in a case that the current image capture of the camera application does not match the associated presentation image of the presentation.

18. The method of claim 14, further comprising:
communicating with the in-range terminal to obtain user credentials of the operator of the in-range terminal, and determines based on the obtained user credentials whether the operator of the in-range terminal is a registered attendee; and
causing the in-range terminal not to display the graphical mark for requesting the presentation, in a case that the operator of the in-range terminal is not a registered attendee.

19. The method of claim 14, further comprising:
maintaining data indicating specific attendees that have received the presentation, and maintaining data indicating special access attendees that have received the selected portion that is designated as being limited access.

20. A non-transitory computer readable medium embodying a program of instructions executable by a computer to perform a method for managing access by a plurality of attendees through a network to a presentation, the method comprising:
registering, in an attendee database, a plurality of attendees and, for each specific attendee amongst the plurality of attendees, a content access status of the specific attendee;
providing a user interface to a presenter terminal, for selecting a presentation from a data storage unit, and for designating a selected portion of the presentation as being limited access;
applying a special content mark to the selected portion of the presentation;
associating the presentation and at least one of (i) an associated location, (ii) an associated perspective direction and (iii) an associated presentation image;
communicating with an in-range terminal to determine whether an operator of the in-range terminal is a registered attendee amongst the plurality of attendees;
causing the in-range terminal to display a graphical mark for requesting the presentation in a case that the operator of the in-range terminal is a registered attendee;
causing presentation data for the presentation, including the selected portion that is designated as being limited access, to be provided to the in-range terminal, when the graphical mark is selected in a case that the operator of the in-range terminal has a content access status that is a special access status; and causing the presentation data excluding the selected portion that is designated as being limited access to be provided to the in-range terminal, in a case that the operator of the in-range terminal does not have the content access status that is a special access status.

\* \* \* \* \*